US007305758B2

(12) United States Patent
Kurooka et al.

(10) Patent No.: US 7,305,758 B2
(45) Date of Patent: Dec. 11, 2007

(54) MANUFACTURING DEVICE OF ELECTRIC WIRE WITH TERMINAL AND MANUFACTURING METHOD OF ELECTRIC WIRE WITH TERMINAL

(75) Inventors: Kazuma Kurooka, Aichi (JP); Junji Onishi, Aichi (JP); Shigeo Minomura, Aichi (JP); Masataka Nishiura, Aichi (JP)

(73) Assignee: J. S. T. Mfg. Co., Ltd., Osaka (JP)

( * ) Notice: Subject to any disclaimer, the term of this patent is extended or adjusted under 35 U.S.C. 154(b) by 189 days.

(21) Appl. No.: 11/080,637

(22) Filed: Mar. 16, 2005

(65) Prior Publication Data

US 2005/0215127 A1 Sep. 29, 2005

(51) Int. Cl.
*B23P 19/00* (2006.01)

(52) U.S. Cl. .......................... 29/753; 29/566.3; 29/749

(58) Field of Classification Search ............... 29/566.3, 29/749, 753

See application file for complete search history.

(56) References Cited

U.S. PATENT DOCUMENTS 4,363,167 A * 12/1982 Boutcher et al. ............. 29/863
4,831,727 A * 5/1989 Johnson et al. ............... 29/866
5,052,449 A 10/1991 Fukuda et al.
5,706,570 A 1/1998 Inoue et al.
5,765,278 A * 6/1998 Koike et al. .................. 29/753
6,279,215 B1 * 8/2001 Nomoto ..................... 29/33 M
6,530,257 B2 * 3/2003 Ooji et al. .................... 72/420
6,722,021 B2 * 4/2004 Takada ........................ 29/753

FOREIGN PATENT DOCUMENTS

EP 0 657 971 A3 5/1997
EP 0 862 251 A1 9/1998
JP 08-315950 11/1996
JP 09-306629 11/1997
WO WO 96/04699 A1 2/1996

* cited by examiner

*Primary Examiner*—Carl J. Arbes
(74) *Attorney, Agent, or Firm*—Rader, Fishman & Grauer PLLC

(57) ABSTRACT

A terminal crimping device is used to manufacture an electric wire with terminal by crimping a terminal fitting onto an end portion of an electric wire. This device includes: an electric wire holding portion to hold the end portion of the electric wire at a predetermined crimping position; a terminal crimping portion to crimp the terminal fitting onto the end portion of the electric wire at the crimping position; and a crimping portion moving mechanism to move the terminal crimping portion along a crimping portion moving direction. The terminal crimping portion is provided to be movable with respect to the end portion of the electric wire held at the crimping position by the electric wire holding portion along the crimping portion moving direction that intersects with a direction along which the end portion of the electric wire extends.

7 Claims, 23 Drawing Sheets

MANUFACTURING DEVICE OF ELECTRIC WIRE WITH TERMINAL AND MANUFACTURING METHOD OF ELECTRIC WIRE WITH TERMINAL

BACKGROUND OF THE INVENTION

1. Field of the Invention

The present invention relates to a manufacturing device of an electric wire with terminal and a manufacturing method of an electric wire with terminal for crimping a terminal fitting onto an end portion of an electric wire.

2. Description of Related Art

A manufacturing device of an electric wire with terminal having a top force and a bottom force opposing each other to crimp a terminal fitting onto an end portion of an electric wire, a press mechanism to caulk the terminal fitting by moving the top force and the bottom force closer or spaced apart, and a base member to support the press mechanism in a fixed state, is known in the related art (for example, Japanese Laid-open Patent Application (KOKAI) Nos. 8-315950 and 9-306629).

A typical example of a product using an electric wire with terminal is a wire harness. The wire harness is manufactured, for example, by crimping plural terminal fittings to one ends of plural electric wires in a one-to-one correspondence, and by pressure welding the other ends of these electric wires to an insulation displacement termination connector. There has been arising a need for a technique such that enables the manufacturing device of an electric wire with terminal as described above to automatically manufacture such a wire harness.

To address this need, it is proposed to provide a manufacturing device of an electric wire with terminal with a terminal crimping portion including the top force, the bottom force, and the press mechanism and fixed to the base member, a transportation device adopting a transfer method to transport an electric wire to the terminal crimping portion, an electric wire supply portion to supply an electric wire to the transportation portion, and an insulation displacement termination device to insulation displacement terminate an insulation displacement termination connector to an electric wire. The transportation device adopting the transfer method transports an electric wire linearly along a predetermined transportation direction. The electric wire supply device, the terminal crimping portion, and the insulation displacement terminating device are disposed along the transportation direction from the upstream side to the downstream side.

The terminal crimping portion is disposed adjacently to the transportation device generally in a direction orthogonal to the transportation direction so as not to interfere with transportation. Hence, the transportation device transports electric wires one by one in succession in the predetermined transportation direction, while guiding each electric wire to a terminal fitting crimping position in the terminal crimping portion by moving the electric wire in the direction orthogonal to the transportation direction. The transportation device may be configured to hold plural electric wires in parallel and transport them collectively.

The transportation device adopting the transfer method, however, moves the electric wire in both the transportation direction and the direction orthogonal to the transportation direction, and therefore has tendencies to become complicated in structure and to increase in size. This in turn increases the overall manufacturing device of an electric wire with terminal in size. In addition, in a case where the transportation device holds plural electric wires in parallel, the transportation device needs a function to move the plural electric wires independently to their corresponding positions, which further complicates the structure.

Moreover, in order to handle plural kinds of electric wires, plural terminal crimping portions corresponding to plural kinds of electric wires may be aligned along the transportation direction. In this case, the manufacturing device is increased further in size.

Furthermore, the need for a size reduction arises not only from a manufacturing device of an electric wire with terminal used to manufacture the wire harness, but also from all types of manufacturing device of an electric wire with terminal.

SUMMARY OF THE INVENTION

An object of the invention is therefore to provide a manufacturing device of an electric wire with terminal of a smaller size yet capable of, for example, crimping terminal fittings onto plural electric wires, and a manufacturing method of an electric wire with terminal applicable to such a manufacturing device.

A manufacturing device of an electric wire with terminal of the invention is a device to manufacture an electric wire with terminal by crimping a terminal fitting onto an end portion of an electric wire. This device includes: an electric wire holding portion to hold the end portion of the electric wire at a predetermined crimping position; a terminal crimping portion to crimp the terminal fitting onto the end portion of the electric wire at the crimping position; and a crimping portion moving mechanism to move the terminal crimping portion along a crimping portion moving direction. The terminal crimping portion is provided to be movable with respect to the end portion of the electric wire held at the crimping position by the electric wire holding portion along the predetermined crimping portion moving direction that intersects with a direction along which the end portion of the electric wire extends.

According to the invention, relative movements between the terminal crimping portion and the electric wire holding portion to supply the electric wires to the terminal crimping portion can be achieved by the crimping portion moving mechanism. This can lower the degree of flexibility or eliminate the flexibility in movements of the electric wire holding portion. It is thus possible to simplify the structures of the electric wire holding portion and the mechanism to move the electric wire holding portion. In addition, the movable range of the terminal crimping portion can be far smaller than a movable range of the transportation device adopting the transfer method, which is as large as the overall manufacturing device of an electric wire with terminal. The manufacturing device of an electric wire with terminal can be therefore reduced in size. Also, because plural crimping positions can be set along the crimping portion moving direction, for example, by moving the terminal crimping portion while plural electric wires are aligned and held by the electric wire holding portion, it is possible to crimp the terminal fittings successively onto the plural electric wires. Moreover, because this advantage can be achieved with the use of the crimping portion moving mechanism, for example, the need to move the electric wire holding portion in the direction along which the electric wires are aligned can be eliminated. This can in turn prevent the electric wire holding portion from becoming complicated in structure and hence from increasing in size. These configurations are therefore preferable to reduce the manufacturing device of an electric wire with terminal in size.

The terminal crimping portion may include a crimping applicator to caulk the terminal fitting onto the end portion of the electric wire, a press mechanism to provide the crimping applicator with a crimping force, and a crimp height adjusting mechanism to adjust a crimp height of the terminal fitting in the crimping applicator. In this case, it is preferable to further include a crimp height control unit to control the crimp height adjusting mechanism depending on a kind of an electric wire subject to crimping. When configured in this manner, in a case where the electric wires subject to crimping are of plural kinds, caulking heights of terminals to be crimped that best suit the electric wires of respective kinds can be readily obtained automatically. Moreover, because the terminal crimping portion can be used commonly for the crimping of plural kinds of electric wires, the manufacturing device of an electric wire with terminal can be reduced further in size.

When the electric wire is a coated electric wire formed by coating a core wire with a coating portion made of a resin material, it is preferable to further include: a strip mechanism having a strip blade to make an incision in the coating portion on the end portion of the electric wire held by the electric wire holding portion, and an incision depth adjusting mechanism to adjust an incision depth to be made by the strip blade; and an incision depth control unit to control the incision depth adjusting mechanism depending on a kind of an electric wire from which the coating portion is to be removed.

When configured in this manner, in a case where the electric wires from which the coating portions are to be removed are coated electric wires of plural kinds, incision depths that best suit the electric wires of respective kinds can be readily obtained automatically. Moreover, because the strip mechanism can be used commonly to remove the coating portions from plural kinds of electric wires, the manufacturing device of an electric wire with terminal can be reduced further in size.

With the configuration described above, it is preferable to further include a strip mechanism moving mechanism to move the strip mechanism almost in parallel with the crimping portion moving direction between a processing position at which removing processing is performed to remove the coating portion from the electric wire and a retraction position retracted from a space between the electric wire holding portion and the crimping position. When configured in this manner, the strip mechanism is allowed to move to the retraction position after it removes the coating portion from the electric wire at the processing position so as not to interfere with crimping. As a result, because the degree of flexibility in the layout of the electric wire holding portion and the terminal crimping portion can be increased, the manufacturing device of an electric wire with terminal can be reduced further in size.

In the invention, it is preferable that the electric wire holding portion is capable of switching between a stopped state where the electric wire is stopped and a released state where stopping of the electric wire is released to allow the electric wire to move, and in this case, it is preferable to further include: an electric wire feeding mechanism to feed the electric wire along an electric wire feeding direction that goes along a direction of the electric wire when held by the electric wire holding portion; and an electric wire length measuring unit to measure a length of the electric wire fed by the electric wire feeding mechanism. When configured in this manner, an electric wire can be fed while the length of the electric wire is measured in the released state. It is thus possible to obtain an electric wire of a desired length with the terminal fitting being crimped onto the end portion. In addition, in a case where plural electric wires of different lengths are handled, the electric wire holding portion can be used commonly for plural electric wires of different lengths. The manufacturing device of an electric wire with terminal can be therefore reduced further in size.

In the invention, it is preferable to further include: an electric wire holding portion advancing/retracting mechanism to cause the electric wire holding portion to advance/retract with respect to the crimping position along a direction of the electric wire when held by the electric wire holding portion; and an insulation displacement terminating portion to insulation displacement terminate the electric wire to an insulation displacement termination connector at a predetermined insulation displacement termination position which is a position in close proximity to the electric wire holding portion when the electric wire holding portion holds the electric wire at a retraction position retracted from the crimping position. When configured in this manner, because the electric wire holding portion can be used commonly for both crimping and insulation-displacement-terminating, the manufacturing device of an electric wire with terminal can be reduced further in size.

In the invention, it is preferable that the electric wire holding portion is capable of holding plural electric wires in parallel along the crimping portion moving direction. When configured in this manner, the terminal fittings can be crimped onto the end portions of the plural electric wires in a one-to-one correspondence. Moreover, because this advantage can be achieved with the use of the crimping portion moving mechanism, the need to move the electric wire holding portion, for example, in the direction along which the electric wires are aligned can be eliminated. This can in turn prevent the electric wire holding portion from becoming complicated in structure and hence from increasing in size. In addition, the electric wire holding portion, being able to hold plural electric wires in parallel, can be reduced in size. The manufacturing device of an electric wire with terminal can be therefore reduced further in size.

A manufacturing method of manufacturing an electric wire with terminal of the invention is a manufacturing method of manufacturing an electric wire with terminal by crimping a terminal fitting onto an end portion of an electric wire by a terminal crimping portion. The manufacturing method includes: an electric wire holding step of holding end portions of plural electric wires at crimping positions on a predetermined crimping line (concurrently or successively); a moving step of moving the terminal crimping portion in a direction parallel to the crimping line and stopping a movement of the terminal crimping portion at each of the crimping positions respectively corresponding to the end portions of the electric wires; and a crimping step of crimping a terminal fitting onto the end portion of the electric wire at each crimping position at which the terminal crimping portion stops in the moving step. According to the manufacturing method of the invention, in a case where the terminal fittings are crimped onto plural electric wires aligned in parallel, the terminal crimping portion is moved for crimping. This can omit or simplify the movements of the electric wire holding portion. Hence, for example, a manufacturing device of an electric wire with terminal adopting this manufacturing method can be reduced in size.

In the manufacturing method of the invention, it is preferable that the electric wire holding step includes a heterogeneous electric wire holding step of holing end portions of electric wires of plural kinds at the crimping positions on the crimping line (concurrently or successively), and in this case, it is preferable to further include a crimp height adjusting step of adjusting a crimp height of the terminal fitting in the terminal crimping portion at each crimping position depending on a kind of an electric wire. When configured in this manner, caulking heights of terminals to be crimped that best suit the electric wires of respective kinds can be readily obtained. Moreover, because the terminal crimping portion can be used commonly for the crimping of plural kinds of electric wires, the manufacturing device of an electric wire with terminal adopting this manufacturing method can be reduced further in size.

In the manufacturing method of the invention, it is preferable that the plural electric wires are coated electric wires each formed by coating a core wire with a coating portion made of a resin material, and in this case, it is preferable to further include a coating removing step of removing the coating portions from the end portions of the plural electric wires using strip blades that make incisions in the coating portions, which is performed before the electric wire holding step. It is also preferable that the coating removing step includes an incision depth adjusting step of adjusting an incision depth to be made by the strip blades depending on kinds of electric wires from which the coating portions are to be removed. When configured in this manner, incision depths that best suit the electric wires of respective kinds can be readily obtained. Moreover, because the strip mechanism can be used commonly to remove the coating portions from plural kinds of electric wires, the manufacturing device of an electric wire with terminal adopting this manufacturing method can be reduced further in size.

In the manufacturing method of the invention, it is preferable to further include: an electric wire feeding step of feeding an electric wire along a direction intersecting with the crimping line; and an electric wire length measuring step of measuring a length of the electric wire fed in the electric wire feeding step. When configured in this manner, it is possible to feed an electric wire while measuring the length of the electric wire. An electric wire of a desired length with the terminal fitting being crimped onto the end portion can be thus obtained. In a case where plural electric wires of different lengths are handled, the electric wire holding portion can be used commonly for the electric wires of different lengths. The manufacturing device of an electric wire with terminal adopting this manufacturing method can be therefore reduced further in size.

In the manufacturing method of the invention, it is preferable to further include an insulation displacement terminating step of insulation-displacement-terminating the plural electric wires commonly to an insulation displacement termination connector. In this case, because the electric wire holding portion can be used commonly for both crimping and insulation-displacement-terminating, the manufacturing device of an electric wire with terminal adopting this manufacturing method can be reduced further in size.

The above and other objects, features, and advantages of the invention will become more apparent from the following description of embodiments with reference to the accompanying drawings.

DETAILED DESCRIPTION OF PREFERRED EMBODIMENTS

Figure 1:
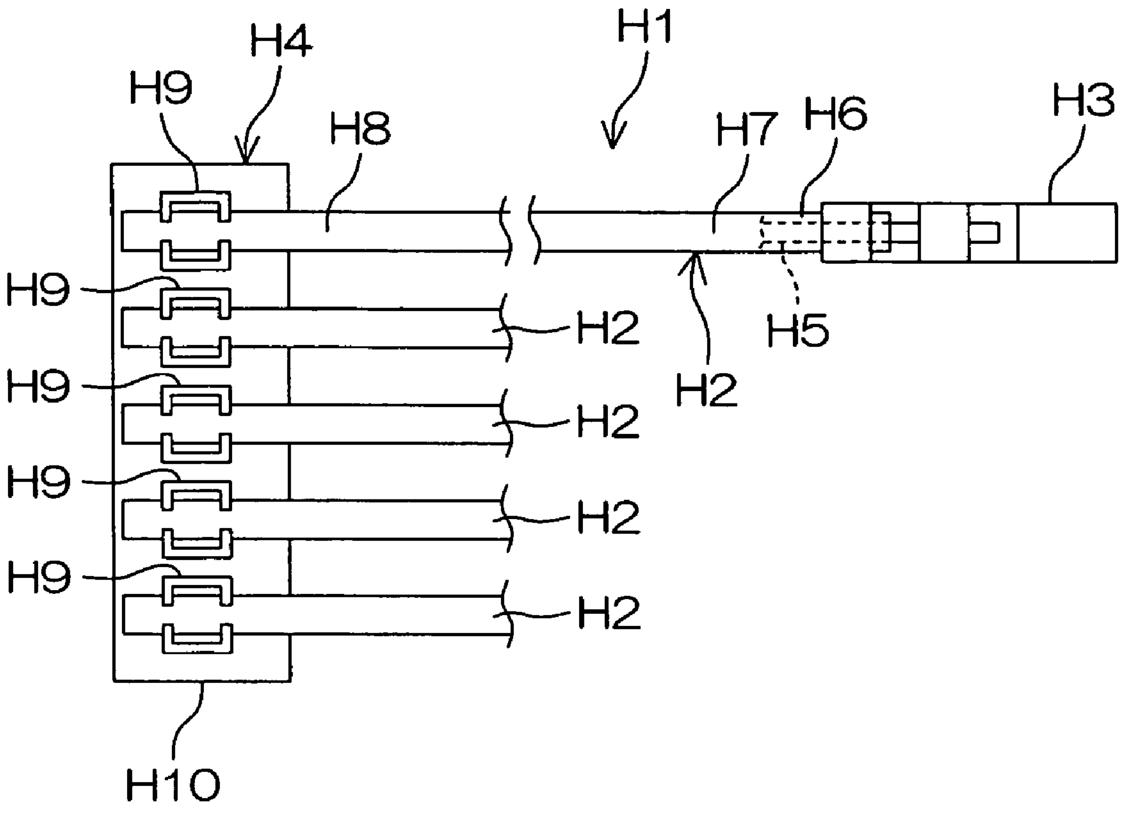
FIG. 1 is a schematic view of a wire harness manufactured by a manufacturing device of an electric wire with terminal according to one embodiment of the invention.

A wire harness manufactured as electric wires with terminals by a manufacturing device of an electric wire with terminal according to one embodiment of the invention will be described first. FIG. 1 is a schematic view of a wire harness.

A wire harness H1 has at least one, for example, five electronic wires H2, at least one, for example, five terminal fittings H3 (only one of them is shown), and one insulation displacement termination connector H4.

Each electric wire H2 is a coated electric wire formed by coating a core wire H5 made of a conductor with a coating portion H6 made of a resin material.

The terminal fittings H3 are crimped onto one end portions H7 of at least one of plural electric wires H2, for example, five electric wires H2. Each terminal fitting H3 includes a barrel serving as a connection portion to be connected to the electric wire H2 by crimping. The barrel comprises, for example, an open barrel having a pair of caulking pieces, and the electric wire H2 can be disposed in the interior in the radial direction by inserting the electric wire H2 through a space between the pair of caulking pieces. The barrel is caulked with the electric wire H2 in such a manner that the electric wire H2 as a member to be disposed inside is encased in the barrel.

The insulation displacement termination connector H4 is insulation displacement terminated to the other end portions H8 of all the electric wires H2 forming the wire harness H1. The insulation displacement termination connector H4 includes plural insulation displacement termination terminals H9, and a connector housing H10 that accommodates and holds these insulation displacement termination terminals H9. Each insulation displacement termination terminal H9 includes a groove-shaped slot that will be connected to the core wire H5 of the electric wire H2 by insulation-displacement-terminating. When the electric wire H2 is pushed into the slot, the coating portion H6 is broken, and the core wire H5 of the electric wire H2 is insulation displacement terminated to the insulation displacement termination terminal H9, thereby establishing an electrical connection.

Figure 2:
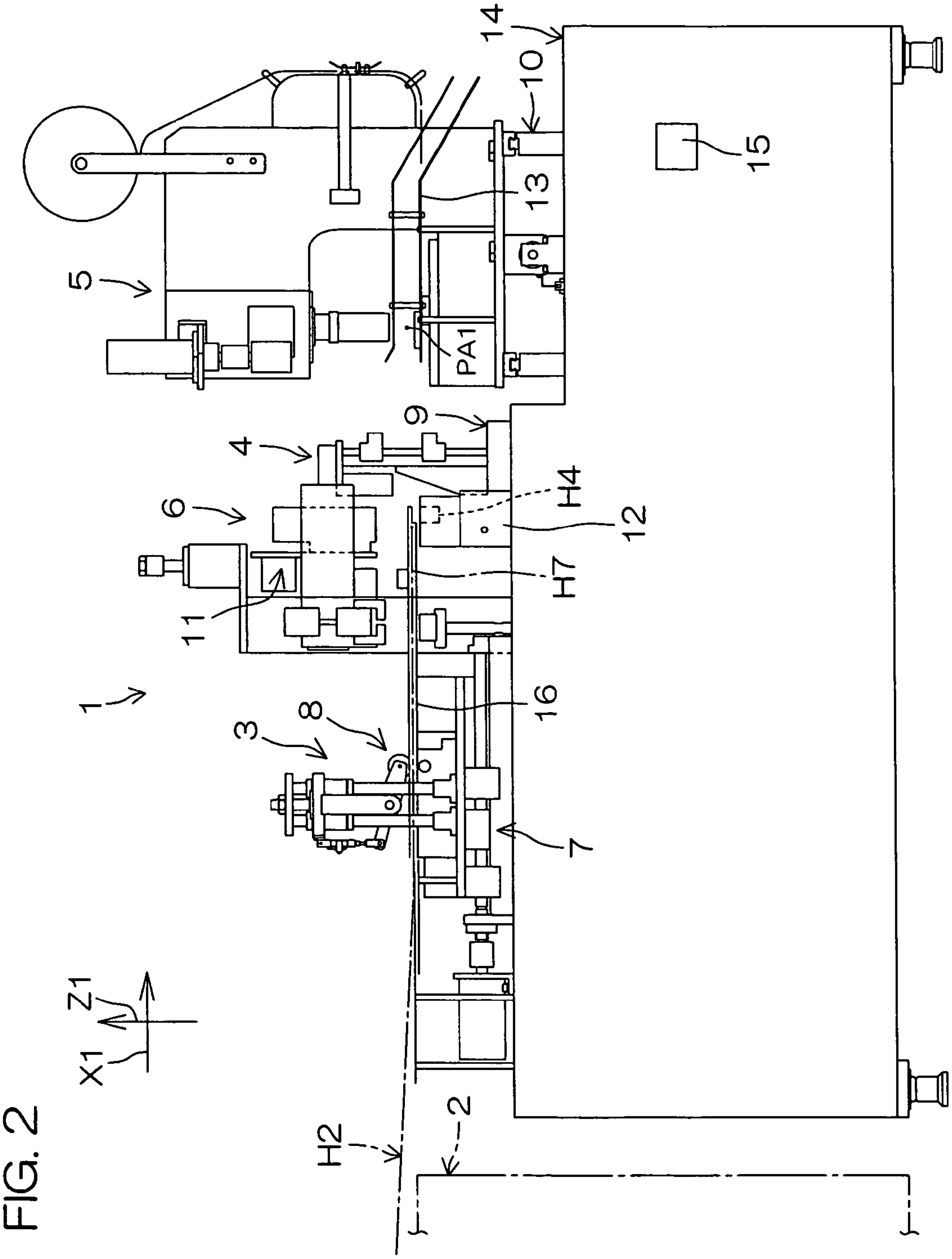
FIG. 2 is a front view of the manufacturing device of an electric wire with terminal according to one embodiment of the invention.
Figure 3:
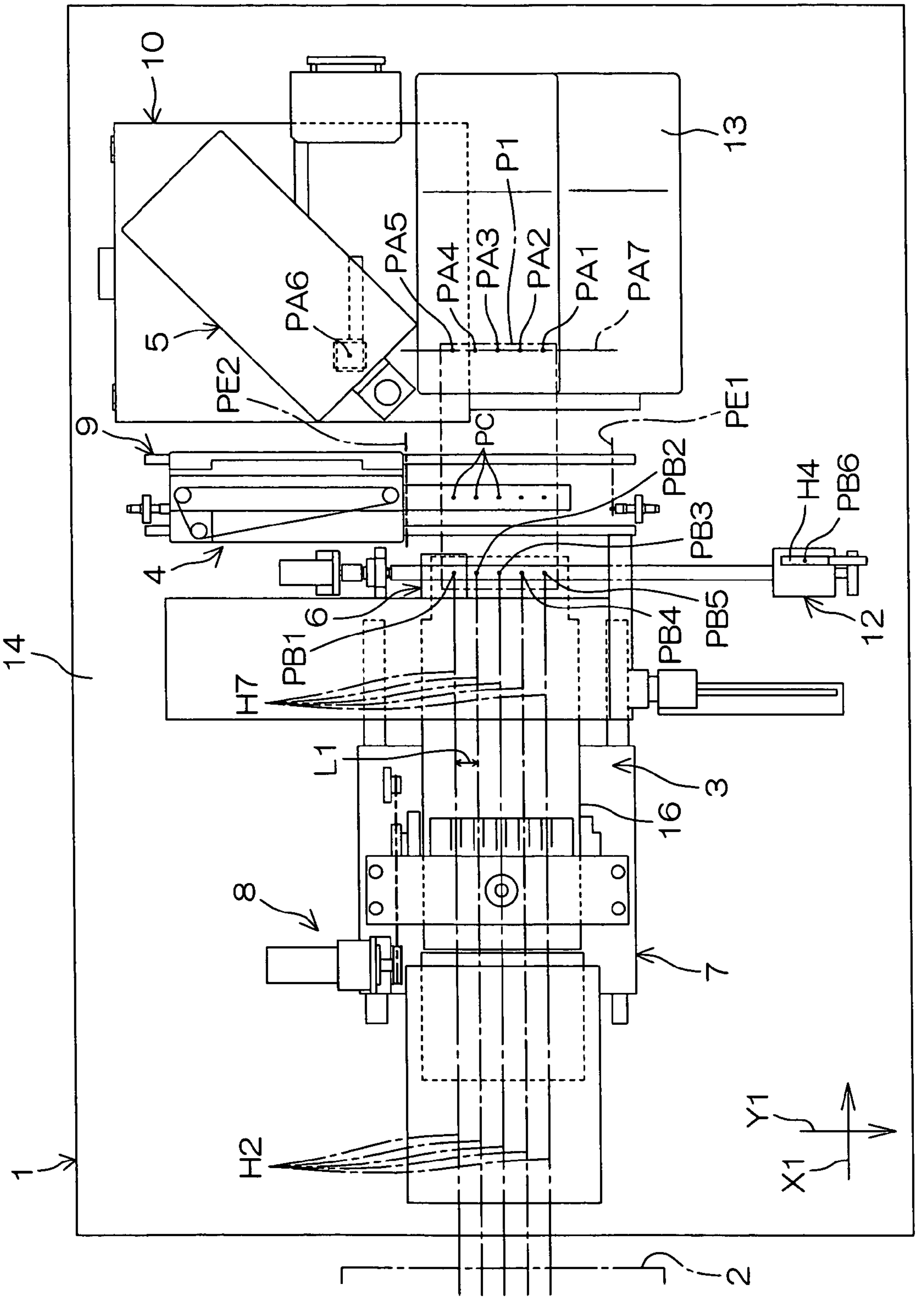
FIG. 3 is a plan view of the manufacturing device of an electric wire with terminal shown in FIG. 2.

FIG. 2 is a front view of the manufacturing device of an electric wire with terminal. FIG. 3 is a plan view of the manufacturing device of an electric wire with terminal.

In this embodiment, the manufacturing device 1 of an electric wire with terminal for crimping the terminal fitting H3 onto the end portion H7 of the electric wire H2 will be described using a case where the device has a structure suitable to manufacture the wire harness H1. It should be appreciated, however, that the device 1 is also able to manufacture, for example, an electric wire with terminal manufactured by merely crimping the terminal fitting H3 onto the end portion H7.

The manufacturing device 1 of an electric wire with terminal has an electric wire holding portion 3 to hold the end portions H7 of continuous, plural electric wires H2 supplied from an electric wire supply device 2 (part of which is shown) provided adjacently to the electric wire holding portion 3, a strip mechanism 4 to remove the coating portions H6 on the end portions H7 of plural electric wires H2 held by the electric wire holding portion 3, a terminal crimping portion 5 to crimp, in a one-to-one correspondence, plural terminal fittings H3 onto the end portions H7 of plural electric wires H2 held by the electric wire holding portion 3 from which the coating portions H6 have been removed, and an insulation displacement terminating portion 6 to insulation displacement terminate cutting ends (equivalent to other end portions H8 of the electric wires H2) of plural electric wires H2, which are let out from the electric wire holding portion 3 by a predetermined length and cut in a predetermined length, to the common insulation displacement termination connector H4.

The electric wire holding portion 3 holds plural electric wires H2. The plural electric wires H2 are aligned along a longitudinal direction Y1 at predetermined intervals. The end portion H7 of each electric wire H2 being held extends along a transverse direction X1. In each drawing, the longitudinal, transverse, and vertical directions are indicated, respectively, by arrows pointing forward, and rightward and upward when viewed from the front.

In the manufacturing device 1 of an electric wire with terminal, a work area P1 is set as an area for the manufacturing work to manufacture the wire harness H1 using plural electric wires H2 held by the electric wire holding portion 3.

The manufacturing device 1 of an electric wire with terminal has an electric wire holding portion advancing/retracting mechanism 7 to allow the electric wire holding portion 3 to advance/retract in the transverse direction X1, and an electric wire feeding mechanism 8, included in the electric wire holding portion 3, to feed plural electric wires H2 held by the electric wire holding portion 3 for the end portions H7 of plural electric wires H2 to be placed at plural crimping positions PA1, PA2, and so forth within the work area P1.

The manufacturing device 1 of an electric wire with terminal further includes: a strip mechanism moving mechanism 9 to move the strip mechanism 4 in the longitudinal direction Y1 between a processing position PE1 within the work area P1, at which the coating portion H6 is removed, and a retraction position PE2 outside the work area P1; a crimping portion moving mechanism 10 to move the terminal crimping portion 5 to plural crimping positions PA1, PA2, and so forth corresponding to plural electric wires H2 and to a retraction position PA6 outside the work area P1 along the longitudinal direction Y1, which is the crimping portion moving direction; an insulation displacement terminating portion moving mechanism 11 to move the insulation displacement terminating portion 6 to plural insulation displacement termination positions PB1, PB2, and so forth corresponding to plural electric wires H2 along the longitudinal direction Y1; and an insulation displacement termination connector moving mechanism 12 to move the insulation displacement termination connector H4 to plural insulation displacement termination positions PB1, PB2, and so forth within the work area P1 that correspond to plural electric wires H2 and to a take-out position PB6 outside the work area P1 along the longitudinal direction Y1.

In addition, the manufacturing device 1 of an electric wire with terminal has a mount 13 to hold electric wires H2 onto which the terminal fittings H3 are crimped. The mount 13 is provided in such a manner that it is allowed to move integrally with the terminal crimping portion 5.

Moreover, the manufacturing device 1 of an electric wire with terminal has a base 14 serving as a supporting member to support the respective portions described above, and a control portion 15 to control the respective portions described above.

Figure 4:
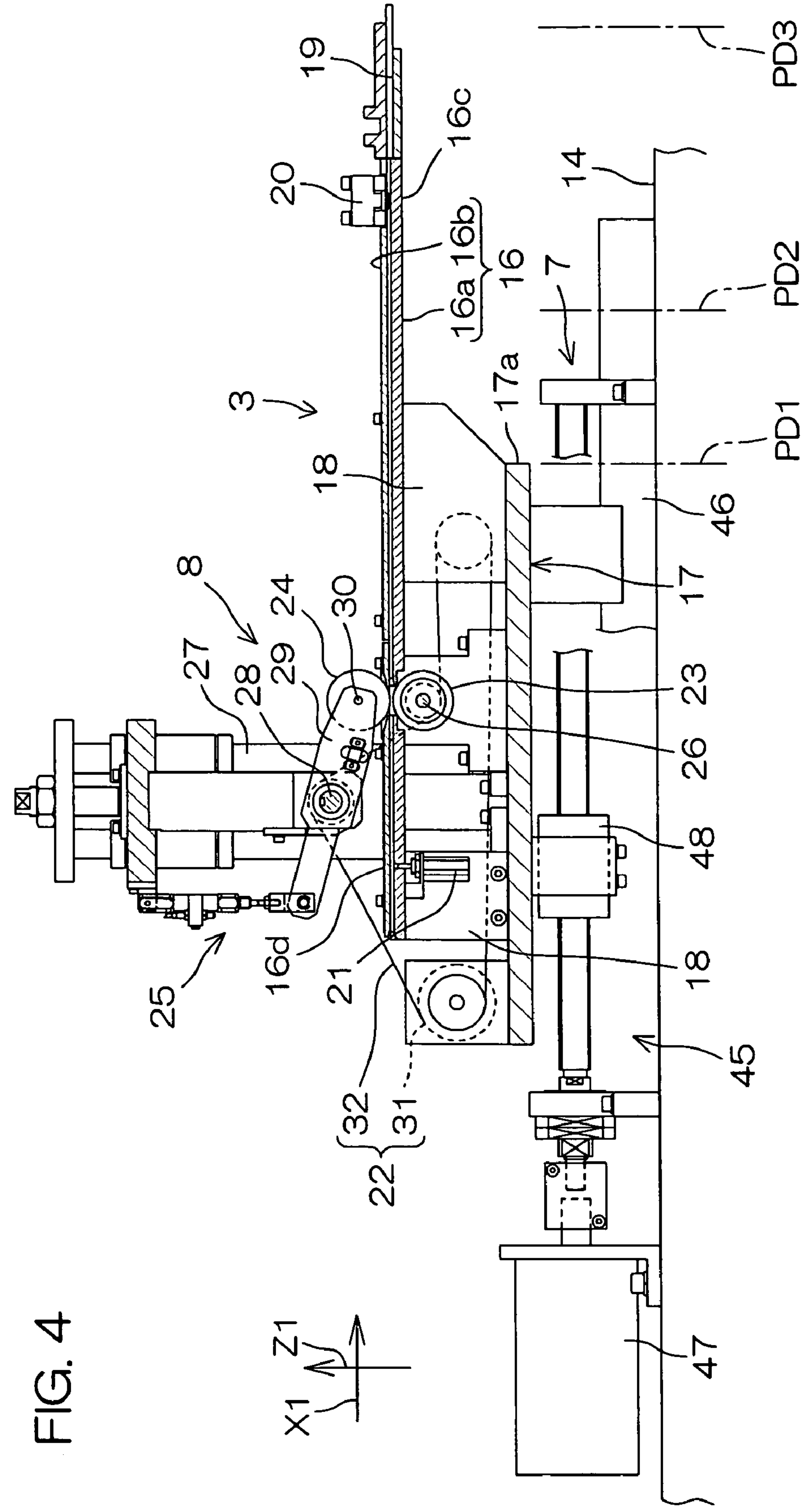
FIG. 4 is a partial cross section of an electric wire holding portion and an electric wire holding portion advancing/retracting mechanism shown in FIG. 2, with a part of which being notched.

FIG. 4 is a partial cross section of the electric wire holding portion 3 and the electric wire holding portion advancing/retracting mechanism 7, with a part of which being notched.

The electric wire holding portion 3 has a holding member 16 to receive and hold plural electric wires H2. The end portions H7 of plural electric wires H2 are thereby disposed in parallel with each other and each extends in parallel with the transverse direction X1.

The holding member 16 is supported on the base 14 via the electric wire holding portion advancing/retracting mechanism 7, a plate-shaped moving stand 17, plural supporting legs 18, etc. The holding member 16 has a bottom plate 16*a*, and plural top plates 16*b* attached oppositely to the top surface of the bottom plate 16*a*.

Plural grooves 19 in the form of concave portions are provided in the top surface of the bottom plate 16*a*, and these plural grooves 19 form holes by being covered with the top plates 16*b*.

The plural grooves 19 are aligned at evenly spaced intervals along the longitudinal direction Y1 and partitioned from one another. Each groove 19 extends in the transverse direction X1 to reach the both end portions on the left and right sides of the holding member 16, and is thereby open at the both ends on the left and right sides. An electric wire H2 is run through each groove 19 along the transverse direction X1 along which the electric wire H2 extends. The inner surface of the groove 19 determines the position of the electric wire H2 by restricting movements of the electric wire H2 in the vertical direction Z1 and the longitudinal direction Y1, while holding the electric wire H2 movably to be guided in the transverse direction X1.

The groove 19 not only holds a portion of the electric wire H2 accommodated therein, but is also able to hold the electric wire H2 by placing a given portion in close proximity to the end portion of the groove 19 when it is fed from the groove 19 as will be described below, for example, the end portion H7, at a predetermined position.

The plural grooves 19 are configured in such a manner that one electric wire H2 is run through each groove 19. Electric wires H2 are thereby held in parallel and spaced apart at a regular pitch L1 (see FIG. 3). Each groove 19 is configured to be able to hold plural kinds of electric wire H2, at least two kinds of electric wire H2. For example, the sectional dimension of the groove 19, to be more specific, the dimension in the longitudinal direction Y1 and the dimension in the vertical direction Z1, are set almost equal to or larger than the outside diameter of an electric wire H2 having the largest outside diameter among plural kinds of electric wires H2 to be held, and smaller than a dimension sufficient to accommodate two electric wires H2 having the smallest outside diameter among plural kinds of electric wires H2 to be held.

The electric wire holding portion 3 has first and second stopping mechanisms 20 and 21 to stop the electric wire H2 in a releasable manner, so that the electric wire H2 in a stopped state will not move.

The first stopping mechanism 20 includes a diaphragm cylinder. The diaphragm cylinder is a hydropneumatic actuator, and has an output portion that is pushed and pressed against an opposing portion 16*c* of the bottom plate 16*a* forming the holding member 16 in a releasable manner. The output portion presses the electric wire H2 against the opposing portion 16*c* in a radial direction of the electric wire. H2, so that the electric wire H2 being pushed is pinched and thereby stopped between the output portion and the holding member 16. The diaphragm cylinder traverses the plural grooves 19 to be disposed above each groove 19, and is attached to the holding member 16. The holding member 16 is provided with a transverse groove (not shown) into which the output portion of the diaphragm cylinder is allowed to enter, so that the output portion can commonly pinch the electric wires H2 held inside the respective grooves 19. When a high-pressure air is supplied to an air chamber in the diaphragm cylinder, the output portion presses all the electric wires H2 against the opposing portion 16*c* of the holding member 16 to stop all the electric wires H2 collectively. When an internal pressure is dropped by releasing the interior of the air chamber in the diaphragm cylinder, the output portion starts to move away from the opposing portion 16*c*, which allows the respective electric wires H2 to move along the grooves 19. In this manner, the first stopping mechanism 20 is able to stop all the electric wires H2 held by the electric wire holding portion 3 concurrently and collectively in a releasable manner.

The second stopping mechanism 21 is able to stop an arbitrary electric wire H2 held by the electric wire holding portion 3 selectively in a releasable manner.

The second stopping mechanism 21 includes plural pneumatic power cylinders (only one of them is shown in the drawing). These plural pneumatic power cylinders are linear moving actuators as well as hydropneumatic actuators. They press the electric wires H2 against opposing portions 16*d* of the top plates 16*b* forming the holding member 16 in the radial direction of the electric wires H2, and thereby pinch and stop the electric wires H2 being pushed in spaces defined with the opposing portions 16*d*. This stopping of the electric wires H2 is releasable.

The plural pneumatic power cylinders are provided to the plural grooves 19 in a one-to-one correspondence to correspond to plural electric wires H2 held by the electric wire holding portion 3. The plural pneumatic power cylinders are allowed to operate independently. Each pneumatic power cylinder has an output portion held by the cylinder tube to be free to advance/retract, and the output portion is allowed to reciprocate linearly by controlling the flow of a high pressure air through a pair of air chambers in the cylinder tube. The cylinder tube of the pneumatic power cylinder is attached to the bottom plate 16*a* forming the holding member 16 to be allowed to move as one unit. The bottom plate 16*a* forming the holding member 16 is provided with a hole that communicates with the groove 19 for each pneumatic power cylinder, and the output portion is allowed to enter into/come out from the groove 19 through this hole. The output portion is forced into the groove 19 by supplying a high pressure air to one of the air chambers in the cylinder tube. Under these conditions, the output portion is able to pinch the electric wire H2 inside the groove 19 in a space defined with the opposing portion 16*d* for the electric wire H2 to stop. Also, the output portion is forced out of the groove 19 by supplying a high pressure air to the other air chamber. Under these conditions, the electric wire H2 is allowed to move.

As has been described, the electric wire holding portion 3 is able to switch between the stopped state where the electric wire H2 is held immovably and a state where the stopped state is released, with the use of the first and second stopping mechanisms 20 and 21. Each electric wire H2 is brought into the stopped state by being stopped by at least one of the first stopping mechanism 20 and the second stopping mechanism

21 corresponding to the electric wire H2. Each electric wire H2 is allowed to move in the transverse direction X1 when it is released from the stopping by the first stopping mechanism 20 and the stopping by the second stopping mechanism 21 corresponding to the electric wire H2. For example, the electric wire H2 moves when it is fed by the electric wire feeding mechanism 8.

The electric wire feeding mechanism 8 is able to feed an electric wire H2 along a predetermined electric wire feeding direction. The predetermined electric wire feeding direction is set along the transverse direction X1 along which the electric wire H2 extends when it is held by the electric wire holding portion 3.

The electric wire feeding mechanism 8 has a driving mechanism 22 to generate a driving force, plural pairs of rollers 23 and 24 serving as feeding members driven by the driving mechanisms 22 to independently feed plural electric wires H2 being pinched, and a selecting mechanism 25 to selectively activate the rollers 23 and 24 to feed at least one of plural electric wires H2 selectively.

The rollers 23 are disposed below the holding member 16, and supported on the moving stand 17 via a shaft 26 to be free to rotate about the central axis line of the shaft 26.

The other rollers 24 are disposed above the holding member 16 and supported on the moving stand 17 via a column 27, a shaft 28, an oscillation arm 29, a shaft 30, etc. The rollers 24 are supported to be free to rotate about the central axis line of the shaft 30. A pair of rollers 23 and 24 and the oscillation arm 29 are provided for each one of plural electric wires H2.

The driving mechanism 22 has an electric motor 31 serving as a driving source, and a belt mechanism 32 serving as a transmission mechanism to transmit a driving force from the electric motor 31 to each pair of rollers 23 and 24.

Figure 5:
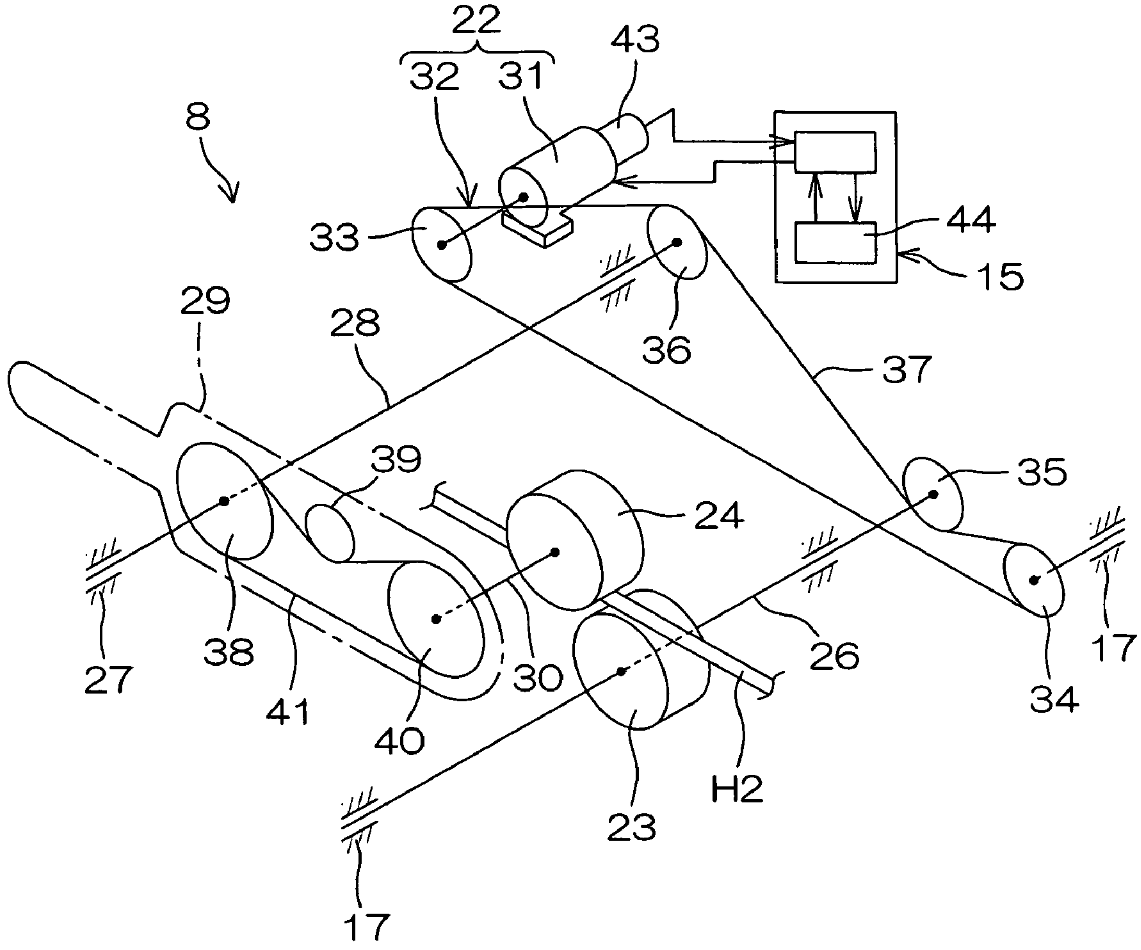
FIG. 5 is a schematic view of a driving mechanism of an electric wire feeding mechanism shown in FIG. 4.

FIG. 5 is a schematic view of the driving mechanism 22.

The electric motor 31 comprises, for example, a servo motor, and a rotation angle of the output shaft thereof is detected, so that it is allowed to rotate at a desired quantity of rotation angle under the control of the control portion 15.

The belt mechanism 32 includes a driving pulley 33 that rotates integrally with the output shaft of the electric motor 31, an idle pulley 34, a first driven pulley 35 that rotates integrally with the rollers 23 via the shaft 26, a second driven pulley 36 linked to the other rollers 24 so that the other rollers 24 are driven by the second driven pulley 36, and a toothed belt 37 stretched over these pulleys 33, 34, 35, and 36. Plural relay pulleys 38 are linked to the second driven pulley 36 via the shaft 28, so that they are allowed to rotate integrally with the second driven pulley 36. The plural relay pulleys 38 are provided to the oscillation arms 29 in a one-to-one correspondence. The second driven pulley 36, the shaft 28, and the plural relay pulleys 38 are supported in such a manner that they are allowed to rotate as one unit about the central axis line of the shaft 28. Also, an idle pulley 39, a driven pulley 40 provided at the tip end are supported on each oscillation arm 29 to be free to rotate. The driven pulley 40 and the relay pulley 38 are linked to each other via a belt 41, so that the driven pulley 40 is driven by the relay pulley 38. The driven roller 40 and the other roller 24 are linked to each other via the shaft 30, so that they are allowed to rotate as one unit.

A pair of rollers 23 and 24 are driven by the electric motor 31, so that the two rollers rotate in opposite directions. This allows an electric wire H2 pinched between the pair of rollers 23 and 24 to move along a direction in which the electric wire H2 extends. Also, by switching the rotational directions of the output shaft of the electric motor 31, it is possible to switch the moving directions of the electric wire H2 pinched between the pair of rollers 23 and 24 to either rightward or leftward in the transverse direction X1.

It should be noted that all pairs of rollers 23 and 24 are driven to rotate by the electric motor 31.

Figure 6A:
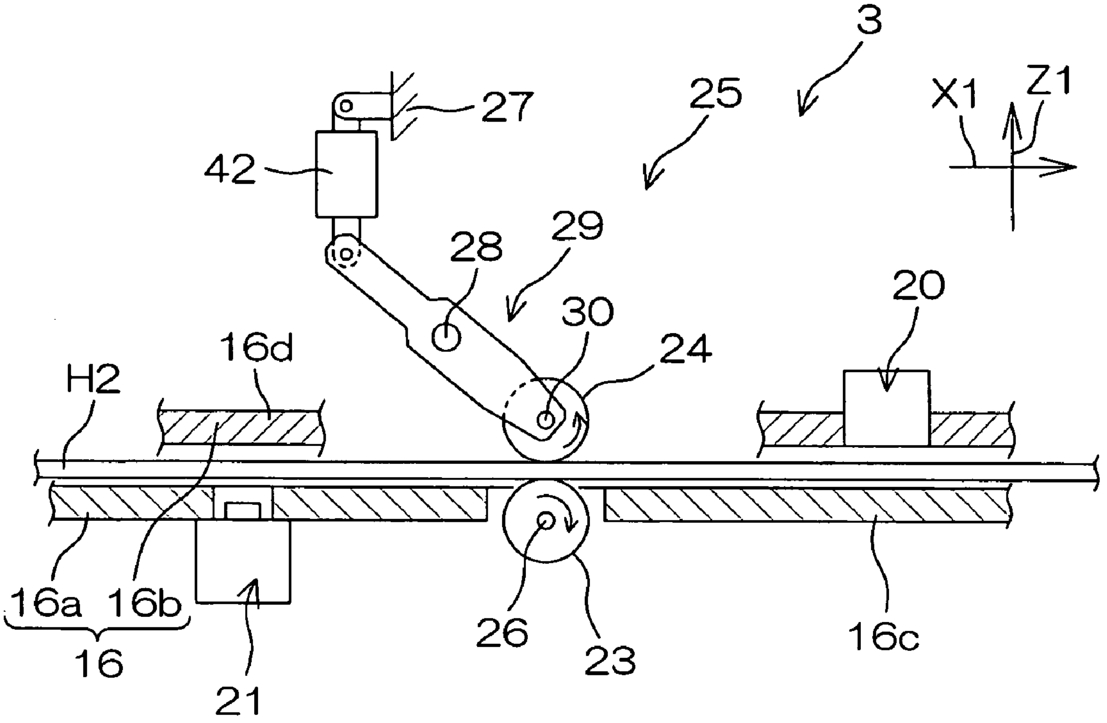
FIG. 6A and FIG. 6B are schematic views used to describe operations of a selecting mechanism in the electric wire feeding mechanism shown in FIG. 4, FIG. 6A showing a feeding state and FIG. 6B showing a non-feeding state.
Figure 6B:
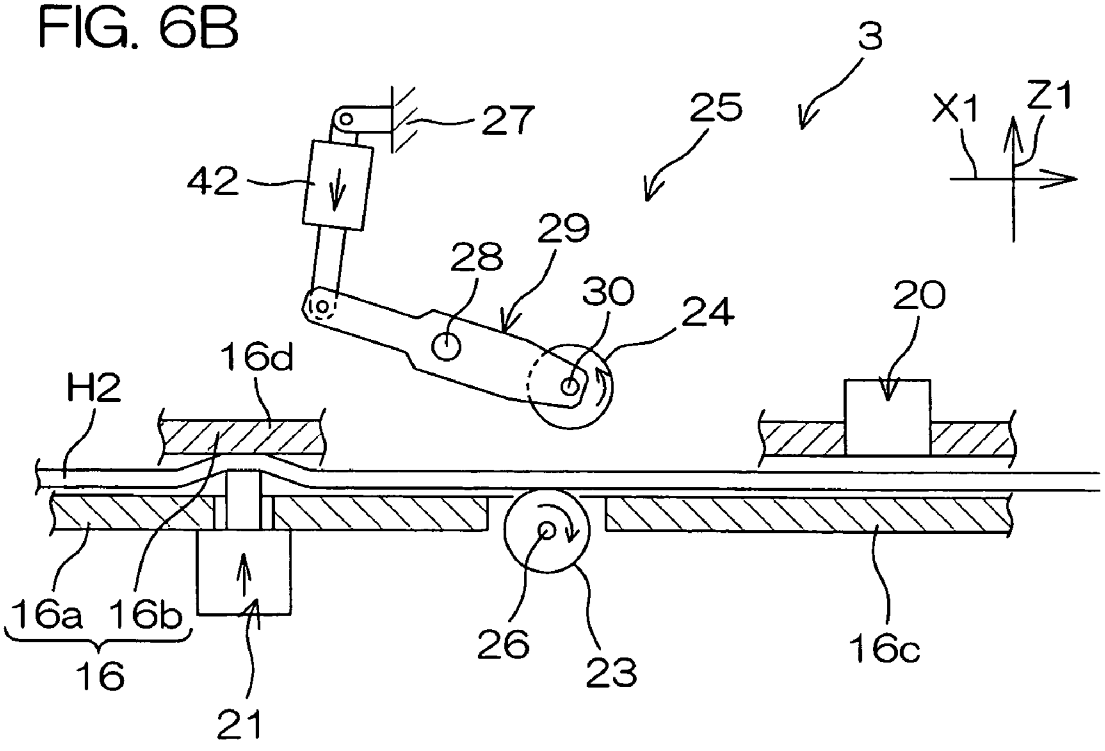

FIG. 6A and FIG. 6B are schematic views used to describe the selecting mechanism 25.

The selecting mechanism 25 is able to select and feed an arbitrary electric wire H2 among plural electric wires H2, and is also able to select an arbitrary electric wire H2 so as not to be fed.

The selecting mechanism 25 has the plural oscillation arms 29 described above as the supporting members each to support a pair of rollers 23 and 24 by switching their state from the pinching state to the releasing state where the pinching is released and vice versa, and plural driving mechanism 42 to drive the plural oscillation arms 29, respectively. These plural pairs of the oscillation arms 29 and the driving mechanisms 42 are provided for the plural electric wires H2 in a one-to-one correspondence. These plural pairs of the oscillation arms 29 and the driving mechanisms 42 are configured in such a manner that each pair is able to operate independently of the other pairs.

The center of each oscillation arm 29 is supported to be free to rotate relatively with respect to the shaft 28 and to be free to oscillate about the center axis line of the shaft 28. The driving mechanism 42 is linked to the other end of the oscillation arm 29 on the opposite side of the roller 24. The driving mechanism 42 includes a pneumatic power cylinder serving as a hydropneumatic actuator used as a driving source to oscillate the oscillation arm 29.

A portion of the selecting mechanism 25 corresponding to a particular electric wire H2 will be described with reference to FIG. 6A. In a case where a particular electric wire H2 is selected to be fed, the stopping by the first stopping mechanism 20 is released, and the stopping by the second stopping mechanism 21 corresponding to the selected electric wire H2 is also released, which brings the electric wire H2 into a state where the electric wire H2 is allowed to move relatively with respect to the holding member 16. A high pressure air is then supplied to one of the air chambers in the pneumatic power cylinder of the driving mechanism 42 corresponding to the electric wire H2, which causes the output portion to contract inside the cylinder tube. The corresponding oscillation arm 29 thereby starts to oscillate in a clockwise direction when viewed from the front, and the roller 24 at the tip end of the oscillation arm 29 is lowered. The electric wire H2 is thereby pinched between the rollers 23 and 24. When the driving mechanism 22 drives the rollers 23 and 24 to rotate under these conditions, a driving force is transmitted to the electric wire H2 via these rollers 23 and 24, and the electric wire H2 starts to move in the transverse direction X1.

Referring to FIG. 6B, in a case where a selected, particular electric wire H2 is prohibited from being fed, a high pressure air is supplied to the other air chamber in the pneumatic power cylinder of the driving mechanism 42 corresponding to the selected electric wire H2, which causes the output portion to protrude from the cylinder tube. The corresponding oscillation arm 29 thereby starts to oscillate in a counterclockwise direction when viewed from the front, and the roller 24 at the tip end of the oscillation arm 29 is lifted up. The electric wire H2 being pinched by a pair of rollers 23 and 24 is thereby released. Under these conditions, even when the corresponding pair of rollers 23 and 24 rotates, a driving force is not transmitted from the pair of rollers 23 and 24 to the electric wire H2. Further, the second stopping mechanism 21 corresponding to the electric wire H2 stops the electric wire H2 to ensure that the electric wire H2 will not be fed.

In a case where a part of plural electric wires H2 are fed selectively and the rest of electric wires H2 are not fed, the flow of a high pressure air through plural pneumatic power cylinders of the selecting mechanism 25 is controlled independently. Each pair of rollers 23 and 24 corresponding to a part of electric wires H2 to be fed is brought into the pinching state, while each pair of rollers 23 and 24 corresponding to the rest of the electric wires H2 not to be fed is released from the pinching state. In a case where all the electric wires H2 are fed, the flow of a high pressure air through the plural pneumatic power cylinders of the selecting mechanism 25 is controlled in the same manner to bring all pairs of rollers 23 and 24 into the pinching state.

FIG. 5 will now be referred to again.

The electric wire holding portion 3 has a rotation angle detector 43 serving as an electric wire length measuring unit to measure the length of an electric wire H2 fed by the electric wire feeding mechanism 8. The rotation angle detector 43 detects a quantity of rotation angle of the output shaft of the electric motor 31 in the driving mechanism 22 of the electric wire feeding mechanism 8, and is used not only to measure a length of the electric wire H2, but also to control the electric motor 31.

The control portion 15 has a calculation portion 44 to calculate a length of the fed electric wire on the basis of an output signal from the rotation angle detector 43.

The calculation portion 44 has found and stored previously a relation between a quantity of rotation angle of the output shaft of the electric motor 31 and a length of the fed electric wire H2, for example, a feeding length of an electric wire H2 when the output shaft of the electric motor 31 rotates by a unit angle quantity. In a case where a feeding length of a particular electric wire H2 is to be measured, a quantity of rotation angle of the output shaft of the electric motor 31 is detected by the rotation angle detector 43 from the timing at which the feeding of the particular electric wire H2 starts, that is, the starting timing at which the driving of the electric motor 31 is started, to a predetermined detection timing during the measurement of a length, under the control of the control portion 15. The feeding length of the electric wire H2 is calculated on the basis of the detected quantity of rotation angle and the relation described above.

The control portion 15 controls the electric wire feeding mechanism 8 while calculating the feeding length of a desired electric wire H2 by means of the calculation portion 44, and is thereby able to feed the electric wire H2 by a desired length. To be more specific, information specifying which electric wire H2 among plural electric wires H2 is to be fed, and information including a feeding quantity and a feeding direction of the electric wire H2 to be fed have been previously inputted in the control portion 15. The control portion 15 controls the electric wire feeding mechanism 8 and the selecting mechanism 25 for the electric wire H2 to be fed on the basis of the input information, and feeds the electric wire H2 to be fed while calculating the feeding length by means of the calculation portion 44 each time a predetermined time has passed. When the calculated length reaches the predetermined feeding quantity, the control portion 15 stops the driving of the electric wire feeding mechanism 8 by means of the electric motor 31.

FIG. 4 will now be referred to.

The electric wire holding portion advancing/retracting mechanism 7 has a driving mechanism 45 to generate a driving force, and a linearly moving bearing 46 serving as a guiding portion to guide the moving stand 17 serving as a moving member driven by the driving mechanism 45 along the transverse direction X1. The moving stand 17 is supported on the base 14 via the linearly moving bearing 46 to be free to move, and driven by the driving mechanism 45 to move in the transverse direction X1 with respect to the base 14.

The driving mechanism 45 has an electric motor 47 serving as a driving source, and a ball screw mechanism 48 serving as a transmission mechanism to transmit a driving force from the electric motor 47 to the moving stand 17. The electric motor 47 comprises, for example, a stepping motor, and is able to control a quantity of rotation angle, a rotation angle position, and a rotation direction of the output shaft by means of the control portion 15. The ball screw mechanism 48 converts rotations of the output shaft of the electric motor 47 to linear movements of the moving stand 17 along the transverse direction X1.

The electric wire holding portion advancing/retracting mechanism 7 is able to position the moving stand 17 and hence the electric wire holding portion 3 as desired under the control of the control portion 15. This allows the electric wire holding portion 3 to advance/retract with respect to crimping positions PA1, PA2, and so forth along the transverse direction X1, which is a direction of the electric wire H2 when it is held by the electric wire holding portion 3. For example, the electric wire holding portion 3 is positioned at a first position PD1 as a retraction position retracted with respect to the crimping positions PA1, PA2, and so forth, at a second position PD2, present on the right side of the first position PD1, at which the coating portion H6 is removed from the electric wire H2 by the strip mechanism 4, and at a third position PD3, present on the right side of the second position PD2 and set in close proximity to the crimping positions PA1, PA2, and so forth. FIG. 4 shows the first position PD1, the second position PD2, and the third position PD3 as the positions of the right end portion 17*a* of the moving stand 17 at the respective positions.

As will be described below, the end portions H7 of the electric wires H2 held by the electric wire holding portion 3 can be positioned at the stripping positions PA1, PA2, and so forth, at the insulation displacement termination positions PB1, PB2, and so forth, and at the striping position PC (see FIG. 3) at which the coating portions H6 on the end portions H7 are removed from the electric wires H2, by the electric wire holding portion advancing/retracting mechanism 7 and the electric wire feeding mechanism 8.

Figure 7:
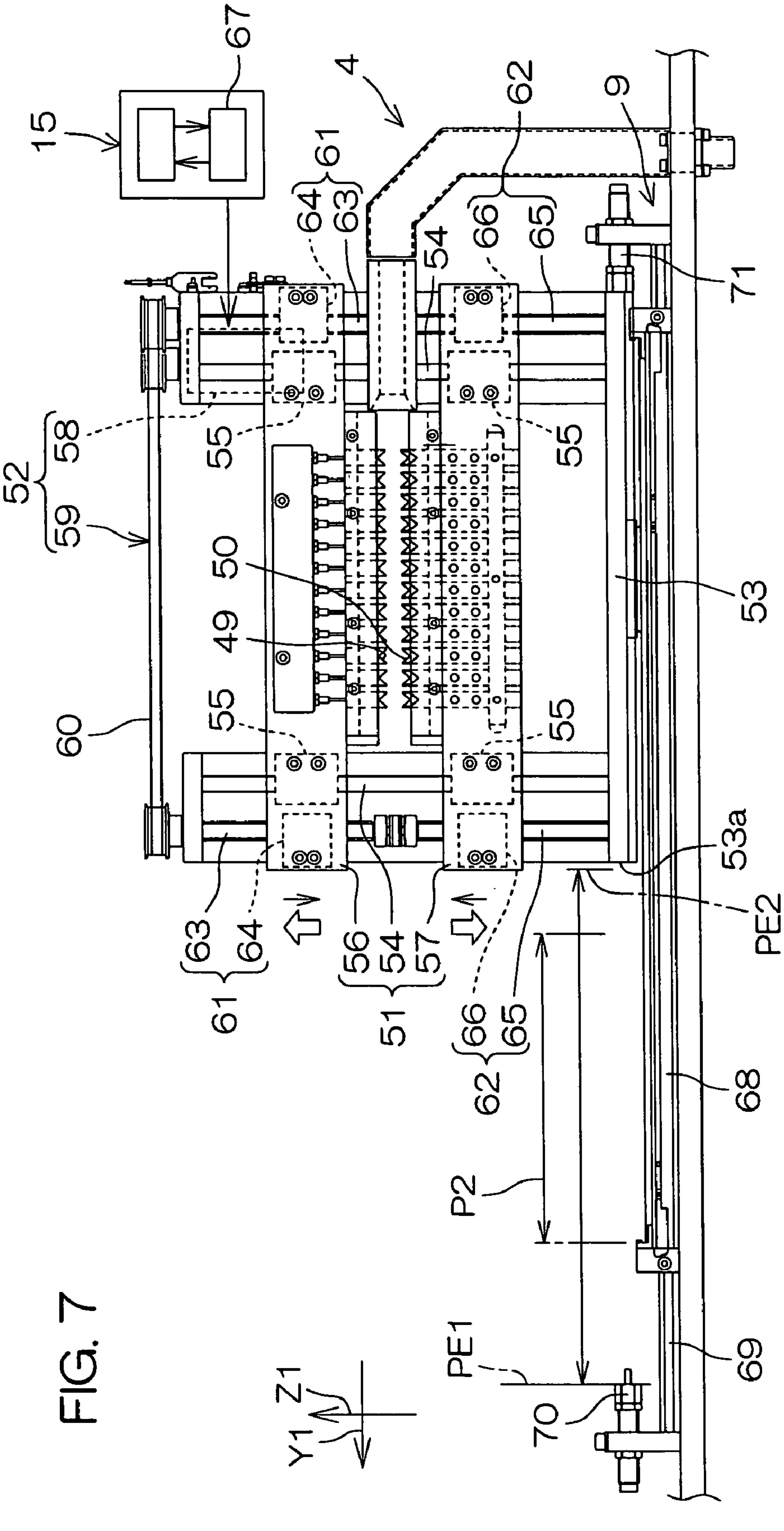
FIG. 7 is a side view of a strip mechanism and a strip mechanism moving mechanism shown in FIG. 2.
Figure 8A:
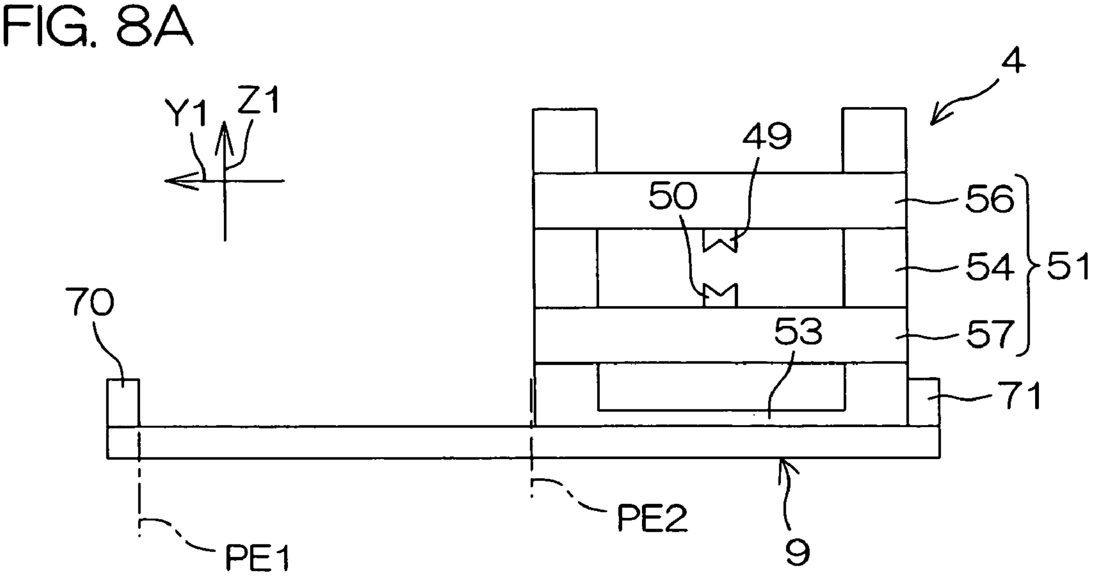
FIG. 8A, FIG. 8B, and FIG. 8C are schematic views used to describe operations of the strip mechanism and the strip mechanism moving mechanism of FIG. 7, FIG. 8A showing a state where the strip mechanism is present at a retraction position, FIG. 8B showing a state where the strip mechanism is present at a processing position and strip blades are spaced apart, and FIG. 8C showing a state where the strip mechanism is present at the processing position and the strip blades are in close proximity.
Figure 8B:
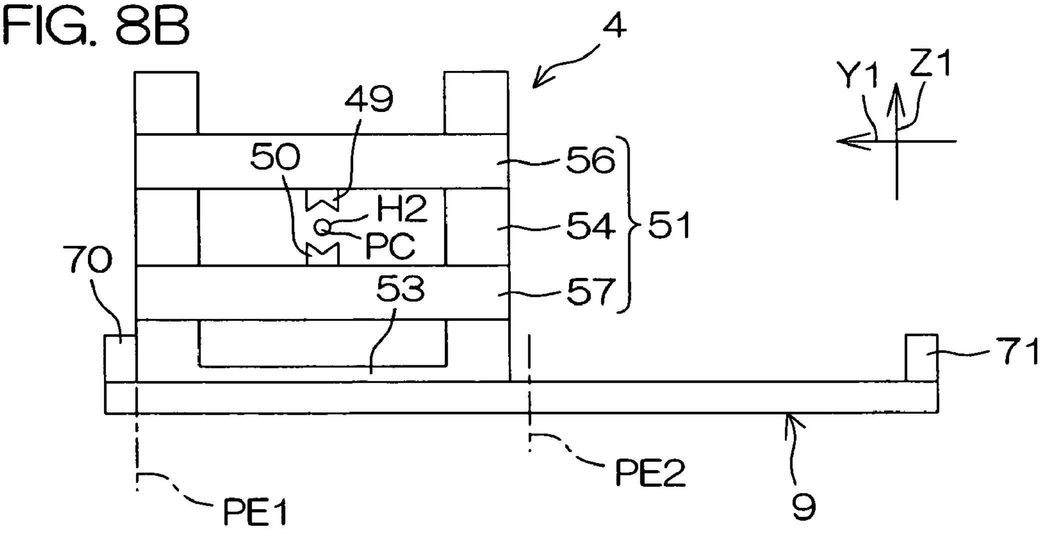
Figure 8C:
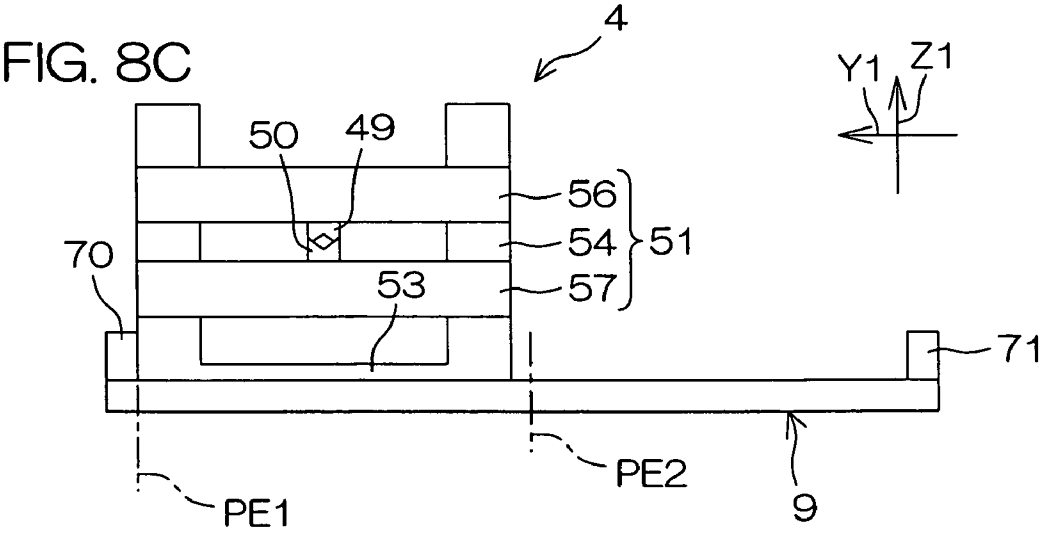
Figure 9:
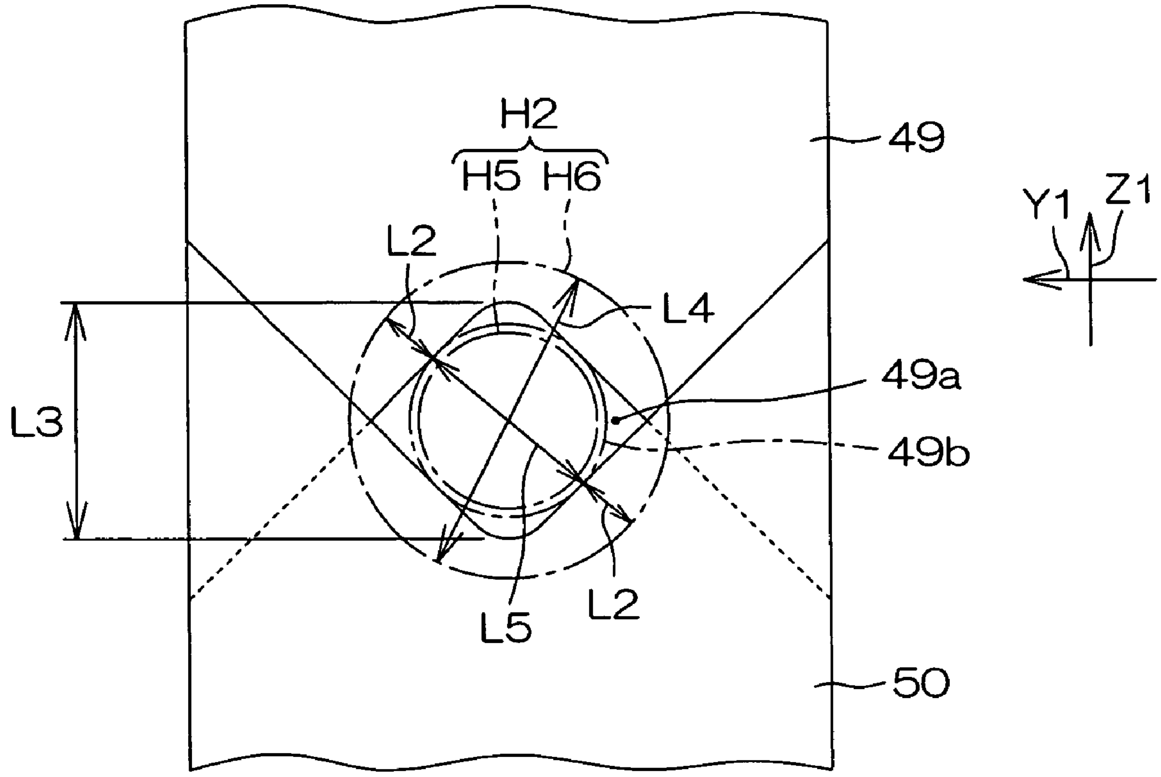
FIG. 9 is an enlarged view of the strip blades in the strip mechanism of FIG. 7.

FIG. 7 is a side view of the strip mechanism 4 and the strip mechanism moving mechanism 9. FIG. 8A, FIG. 8B, and FIG. 8C are schematic views used to describe operations of the strip mechanism 4 and the strip mechanism moving mechanism 9. FIG. 9 is an enlarged view of a major portion of the strip mechanism 4.

The strip mechanism 4 makes an incision in the coating portion H6 on the end portion H7 of the electric wire H2 and then removes the coating portion H6 when it is moved to a processing position PE1 by the strip mechanism moving mechanism 9 as will be described below (see FIG. 8B and FIG. 8C). In this instance, the electric wire H2 is held by the electric wire holding portion 3 at the strip position PC to protrude from the end portion of the electric wire holding portion 3. The strip mechanism 4 at the processing position PE1 is disposed to overlap the end portion H7 of the electric wire H2 held at the strip position PC, that is, a portion protruding from the end portion of the electric wire holding portion 3, when viewed in a plane.

The strip mechanism 4 has plural pairs of strip blades 49 and 50 (part of which is shown in the drawing) to make incisions in the coating portions H6 on the end portions H7 of plural electric wires H2, a guiding portion 51 to guide the movements of the strip blades 49 and 50 while supporting the strip blades 49 and 50 movably to enable the strip blades 49 and 50 to make incisions in the coating portions H6, a driving mechanism 52 to drive the strip blades 49 and 50 to enable them to make incisions, and a moving stand 53, supported on the base 14 via the strip mechanism moving mechanism 9, to support the driving mechanism 52, the guiding portion 51, the strip blades 49 and 50, etc.

Plural pairs of strip blades 49 and 50 are provided for plural electric wires H2 in a one-to-one correspondence. The strip blades 49 and 50 are provided on both sides along the vertical direction Z1 by sandwiching the end portions H7 of the electric wires H2 positioned at the strip position PC. Each of the strip blades 49 and 50 has a blade portion of a concave shape open to the electric wire H2, for example, almost in the shape of a capital V, as a portion corresponding to the electric wire H2. The blade portions of the strip blades 49 and 50 oppose each other with the electric wire H2 in between. The strip blades 49 and 50 are supported to be free to move along the vertical direction Z1, so that they are brought in close proximity to or spaced apart from each other. When the strip blades 49 and 50 are brought in close proximity to each other, their opposing side surfaces on the left and on the right are brought into line with each other, so that a hole 49*a* is defined between the blade portions (see FIG. 9). The hole 49*a* is of a size large enough for the core wire H5 of the corresponding electric wire H2 to pass through but too small for the coating portion H6 to pass through. The peripheral edge portion of the hole 49*a*, that is, the blade portions of the strip blades 49 and 50 make an incision having a predetermined incision depth L2 (see FIG. 9) in the coating portion H6 of the electric wire H2.

The guiding portion 51 has a pair of guiding shafts 54 that are fixed to the moving stand 53 at spaced apart and extend in the vertical direction Z1, an upper movable portion 56 free to move in the vertical direction Z1 on the pair of guiding shafts 54 via bearings 55, and a lower movable portion 57 free to move in the vertical direction Z1 on the pair of guiding shafts 54 via the bearings 55. Plural strip blades 49 are attached to the upper movable portion 56 to be allowed to move as one unit. Also, plural strip blades 50 are attached to the lower movable portion 57 to be allowed to move as one unit. This configuration enables the guiding portion 51 to guide the plural pairs of strip portions 49 and 50 along the vertical direction Z1.

The driving mechanism 52 has an electric motor 58 serving as a driving source to generate a driving force, and a transmission mechanism 59 to transmit a driving force from the electric motor 58 to both the upper movable portion 56 and the lower movable portion 57.

The electric motor 58 comprises, for example, a stepping motor, and is able to control a quantity of rotation angle, a rotation angle position, and a rotation direction of the output shaft by means of the control portion 15.

The transmission mechanism 59 not only transmits a driving force, but also converts rotational motions of the output shaft of the electric motor 58 to linear motions of both the upper movable portion 56 and the lower movable portion 57. The converted linear motions are linear motions such that allow the upper movable portion 56 and the lower movable portion 57 to move at the equal quantity of movements to come in close proximity to or move apart from each other.

To be more concrete, the transmission mechanism 59 includes a belt mechanism 60, and at least a pair, for example, two pairs of screw mechanisms 61 and 62 each having reverse screws. The screw mechanism 61 includes a screw shaft 63, and a female screw member 64 that is threaded into the screw shaft 63. The screw mechanism 62 includes a screw shaft 65, and a female screw member 66 that is threaded into the screw shaft 65. A pair of screw shafts 63 and 65 are provided in the form of reverse screws in such a manner that both shafts are linked coaxially to be allowed to rotate as one unit. A driving force is transmitted from the electric motor 58 to two pairs of screw shafts 63 and 65 via the belt mechanism 60. Two pairs of screw shafts 63 and 65 extend in parallel with the vertical direction Z1, and are supported on the moving stand 53 rotatably but immovably in the vertical direction Z1. The female members 64 are attached to the upper movable portion 56 to be allowed to move as one unit. The other female members 66 are attached to the lower movable portion 57 to be allowed to move as one unit.

When the output shaft of the electric motor 58 rotates in one direction, the two pairs of screw shafts 63 and 65 rotate in one direction via the belt mechanism 60. This in turn causes a pair of female screw members 64 and 66 respectively threaded into a pair of the screw shafts 63 and 65 to move in opposite directions, for example, along the vertical direction Z1 to come in close proximity to each other. The upper movable portion 56 and the lower movable portion 57, and hence the strip blades 49 and the strip blades 50 thereby come in close proximity to each other (see FIG. 8C). Conversely, when the output shaft of the electric motor 58 rotates in the other direction, the upper movable portion 56 and the lower movable portion 57, and hence the strip blades 49 and the strip blades 50 move away from each other via the transmission mechanism 59 (see FIG. 8B).

The control portion 15 controls the electric motor 58 of the strip mechanism 4 to bring the strip blades 49 and the strip blades 50 in close proximity to each other at a specific interval L3 that has been previously determined, and subsequently move them spaced apart. When the strip blades 49 and the strip blades 50 come in close proximity at the specific interval L3, a pair of strip blades 49 and 50 are allowed to make an incision in the coating portion H6 on the end portion H7 of the electric wire H2 (see FIG. 9).

The specific interval L3 is an interval between the blade portions of the strip blade 49 and the strip blade 50 when they come in the closest proximity to each other with the end portion H7 of the electric wire H2 in between, and is equal to a size of the hole 49*a*. A difference between the outside diameter L4 of the coating portion H6 of the electric wire H2 and the diameter L5 of the inscribed circle 49*b* of the hole 49*a* is equal to twice the value of the incision depth L2.

In this embodiment, the driving mechanism 52 of the strip mechanism 4 constitutes an incision depth adjusting mechanism to adjust the incision depth L2 to be made by the strip blades 49 and 50.

The control portion 15 includes a control section 67 as an incision depth control unit to control the driving mechanism 52 serving as the incision depth adjusting mechanism, so that the incision depth L2 of a predetermined value can be obtained depending on the kind of an electric wire H2 from which the coating portion H6 is to be removed.

The control section 67 receives a command signal from the CPU. The command signal contains the kind of an electric wire H2 into which an incision is to be made. The control section 67 sets the rotation angle position of the output shaft of the electric motor 58 to the predetermined position depending on the kind of the electric wire H2 specified in the command signal. The predetermined position is selected among plural pre-stored positions to best suit the kind of an electric wire H2. By controlling the rotation angle position of the output shaft of the electric motor 58 of the driving mechanism 52 to the predetermined position, it is possible to place the upper movable portion 56 and the lower movable portion 57 at predetermined positions in the vertical direction Z1 via the transmission mechanism 59, which in turn makes it possible to achieve the specific interval corresponding to the incision depth L2 to be made by the strip blade 49 and the strip blade 50.

The strip mechanism moving mechanism 9 moves the strip mechanism 4 along the longitudinal direction Y1 parallel to the crimping portion moving direction between the processing position PE1 at which removing processing is performed to remove the coating portion H6 from the electric wire H2 and the retraction position PE2 behind the processing position PE1. The retraction position PE2 is a position retracted from a region P2 (a range of the region P2 in the longitudinal direction Y1 is shown in FIG. 7) between the electric wire holding portion 3 positioned at the second position PD2 for the removing processing to be performed and the crimping positions PA1, PA2, and so forth. The electric wire holding portion advancing/retracting mechanism 7 thus allows the electric wire holding portion 3 to move across the region P2 ahead the strip mechanism 4 at the retraction position PE2. The processing position PE1 and the retraction position PE2 are shown as the positions of the front end 53*a* of the moving stand 53 in FIG. 7 and FIGS. 8A through FIG. 8C.

The strip mechanism moving mechanism 9 has a driving mechanism 68 to generate a driving force, and a linearly moving bearing 69 serving as a guiding portion 51 driven by the driving mechanism 68 to guide the moving stand 53 along the longitudinal direction Y1. The moving stand 53 is supported on the base 14 to be free to move in the longitudinal direction Y1 via the linearly moving bearing 69. A pair of stoppers 70 and 71 to restrict the movements of the moving stand 53 are provided in such a manner that the two stoppers correspond respectively to both ends of a movable range of the moving stand 53.

The driving mechanism 68 includes a hydropneumatic actuator serving as a driving source, for example, a pneumatic power cylinder. The pneumatic power cylinder has a pair of air chambers and an output portion that reciprocate linearly as the flow of a high pressure air through the pair of air chamber is controlled. The output portion is attached to the moving stand 53 to be allowed to move as one unit.

When a high pressure air is supplied to one of the air chambers in the pneumatic power cylinder under the control of the control portion 15, the moving stand 53 starts to move forward and continues to move until it is stopped by abutting on the stopper 70 on the front. The strip mechanism 4 is thereby placed at the processing position PE1. When a high pressure air is supplied to the other air chamber in the pneumatic power cylinder, the moving stand 53 starts to move backward and continues to move until it is stopped by abutting on the stopper 71 on the back. The strip mechanism 4 is thereby placed at the retraction position PE2.

Figure 10:
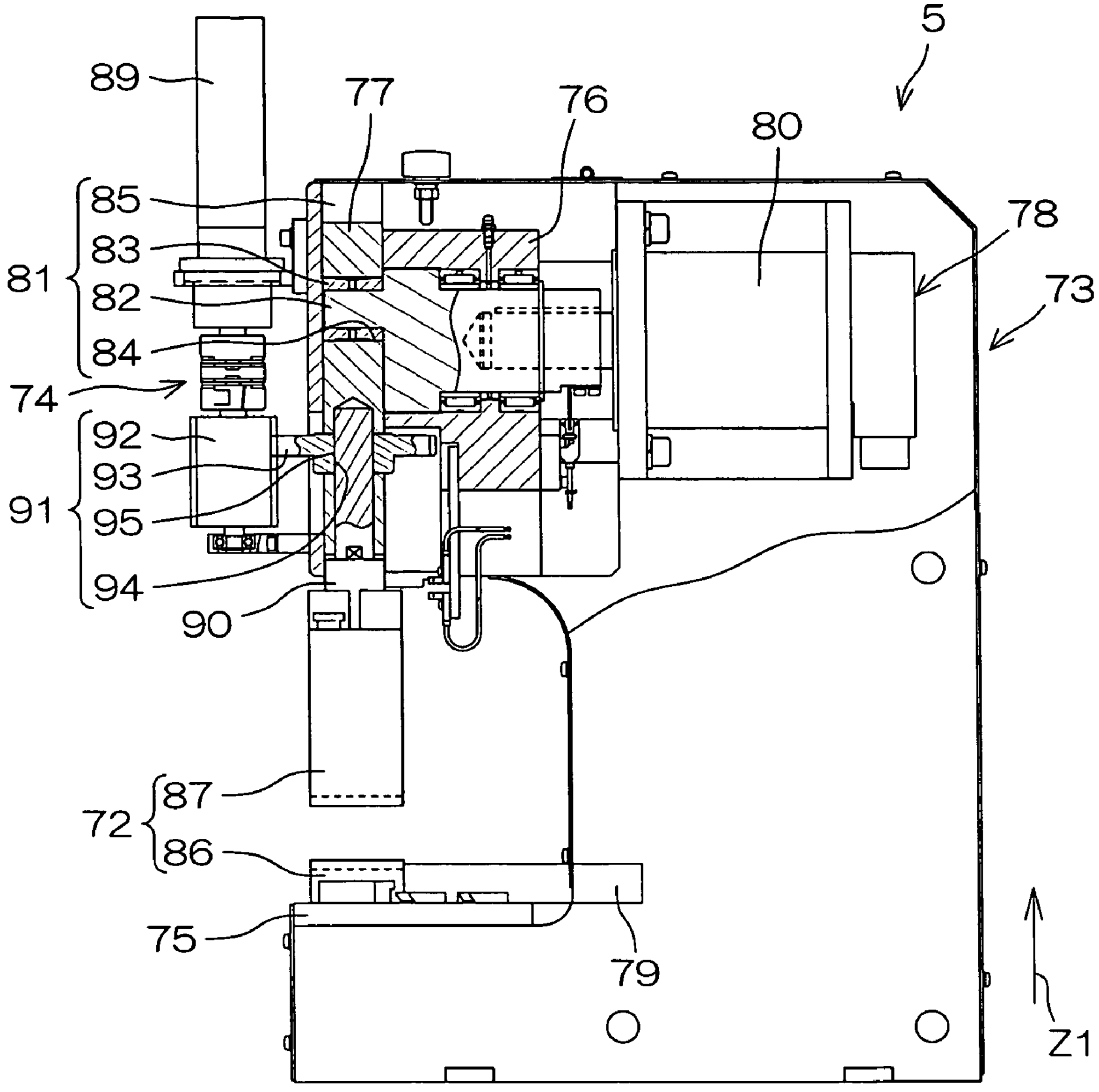
FIG. 10 is a partial sectional side view of a terminal crimping portion shown in FIG. 2.
Figures 11A, 11B:
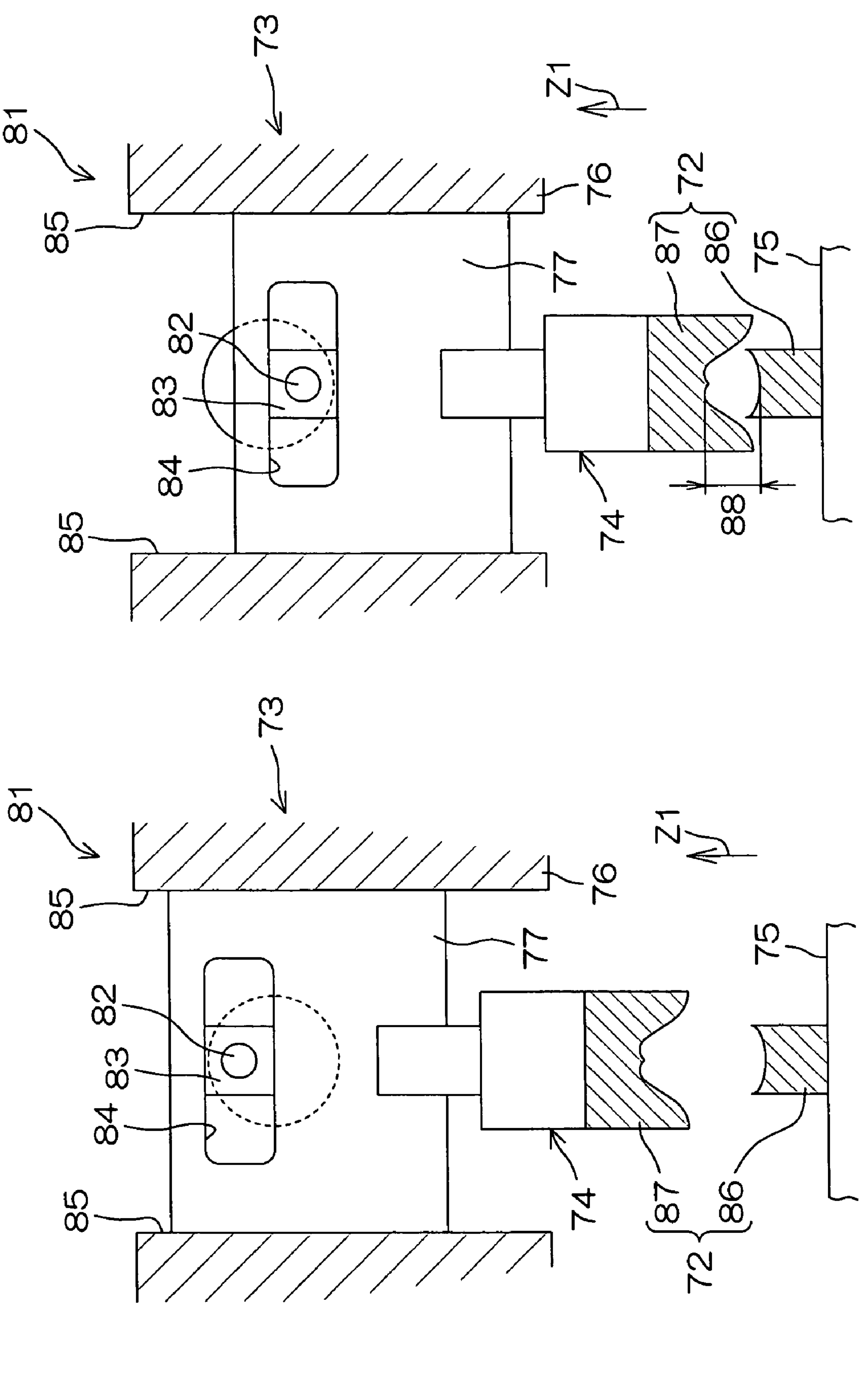
FIG. 11A and FIG. 11B are schematic views used to describe operations of the terminal crimping portion of FIG. 10, FIG. 11A showing a state where a press ram is present at an upper dead point and FIG. 11B showing a state where the press ram is present at a lower dead point.

FIG. 10 is a partial sectional side view of the terminal crimping portion 5. FIG. 11A and FIG. 11B are schematic views used to describe operations of the terminal crimping portion 5.

The terminal crimping portion 5 includes a crimping applicator 72 to caulk the terminal fitting H3 onto the end portion H7 of the electric wire H2, a press mechanism 73 to provide the crimping applicator 72 with a crimping force, and a crimp height adjusting mechanism 74 to adjust a crimp height of the terminal fitting H3 in the crimping applicator 72. The press mechanism 73 and the crimp height adjusting mechanism 74 are controlled by the control portion 15. By adjusting the crimp height in the crimping applicator 72, it is possible to adjust a caulking height of the crimped terminal fitting H3 obtained as the result of driving the press mechanism 73.

The terminal crimping portion 5 has a work bench 75, a press housing 76 disposed above the work bench 75, a press ram 77 serving as a moving portion provided to the press housing 76 to be free to move in the vertical direction Z1, and a driving mechanism 78 as a pushing unit to push the press ram 77 by moving the press ram 77 in the vertical direction Z1.

The terminal crimping portion 5 is provided with a terminal fitting supply mechanism 79 to successively supply the terminal fittings H3 to the crimping applicator 72. The terminal fitting supply mechanism 79 sends a strip of terminals (not shown), formed by linking plural terminal fittings H3 in the form of a strip, to the crimping applicator 72, and is able to cut off an end of the terminal strip from the terminal strip to be used as a terminal fitting H3.

The terminal crimping portion 5 is supported on the base 14 via the crimping portion moving mechanism 10. It is disposed in such a manner that the press housing 76 extends in a direction that intersects with the longitudinal direction Y1 diagonally (see FIG. 3), and the sides of the crimping applicator 72 are open in both the transverse direction X1 and the longitudinal direction Y1.

The driving mechanism 78 includes an electric motor 80 serving as a driving source, and a slider crank mechanism 81 serving as a converting mechanism to convert rotational motions of the output shaft of the electric motor 80 to reciprocating motions along the vertical direction Z1. The slider crank mechanism 81 includes an eccentric shaft 82 linked to the output shaft of the electric motor 80 to be allowed to rotate as one unit and disposed eccentrically with respect to the rotation central axis line of the output shaft of the electric motor 80, a sliding member 83 that fits in the eccentric axis 82 to be allowed to rotate relatively with respect to the eccentric shaft 82, a lateral hole 84 in the press ram 77 that restricts relative movements of the sliding member 83 in the vertical direction Z1 while guiding the sliding member 83 to be free to slide in the lateral direction that intersects with the vertical direction Z1 at right angles, and a guiding portion 85, provided to the press housing 76, to guide the movements of the press ram 77 in the vertical direction Z1. When the output shaft of the electric motor 80 rotates, the lateral hole 84 and the press ram 77 start to reciprocate in the vertical direction Z1 via the eccentric shaft 82 and the sliding member 83.

The crimping applicator 72 includes a bottom force 86 that is fixed to the work bench 75 to receive the terminal fitting H3, and a top force 87 serving as a crimping head linked to the press ram 77 to be allowed to move as one unit in caulking the fitting terminal H3 in cooperation with the bottom force 86. Each of the bottom force 86 and the top force 87 has a concave portion disposed oppositely to make a pair. The top force 87 is attached to the lower end of the press ram 77 via the crimp height adjusting mechanism 74 to be allowed to move as one unit, and is provided to protrude downward from the lower end of the press ram 77.

At the time of crimping, a terminal to be crimped, which is a part to be pressed, is placed on the lower force 86 of the work bench 75 by the terminal fitting supply mechanism 79.

At the same time, the end portions H7 of the electric wires H2 are disposed between the concave portions in the top force 87 and the bottom force 86. The end portions H7 of the electric wires H2 are disposed at the crimping positions PA1, PA2, and so forth. The top force 87 of the crimping applicator 72 moves downward together with the press ram 77 by driving the electric motor 80 of the press mechanism 73. The bottom force 86 and the top force 87 then come in close proximity to each other and engage with each other, and the end portions H7 of the electric wires H2 are caulked with the barrels of the terminal fittings H3. The end portions H7 of the electric wires H2 are thereby encased in the barrels, and the terminal fittings H3 are crimped onto the electric wires H2.

The caulking height of the terminal fitting H3 is determined by a dies interval 88 (equivalent to the crimp height) between the top force 87 and the bottom force 86 when the press ram 77 is at a lower dead point. The caulking height is set to an optimal value depending on the sizes of the terminal fitting H3, which is a part to be caulked, and the electric wire H2. In order to achieve the optimal value, the crimp height adjusting mechanism 74 of this embodiment is configured to be able to set the dies interval 88 to the pre-set adequate value.

The crimp height adjusting mechanism 74 is interposed between the press ram 77 and the crimping applicator 72, and is able to change the protruding length of the crimping applicator 72 protruding from the lower end of the press ram 77 as needed. By changing the protruding length, the dies interval 88 can be set to the optimal value depending on the kind of the electric wire H2 and the size of the terminal fitting H3.

The crimp height adjusting mechanism 74 has an electric motor 89 serving as a driving source, an operating member 90 provided to the press ram 77 to be allowed to move relatively in the vertical direction Z1, and a linking portion 91 to link the output shaft of the electric motor 89 and the operating member 90. The linking portion 91 transmits rotations of the output shaft of the electric motor 89 to the operating member 90 by converting the rotations to the linear movements in the vertical direction Z1.

The electric motor 89 comprises a stepping motor, and is able to control a rotation direction, a rotation angle position, and a rotation speed of the output shaft of the electric motor 89 as desired.

Figure 12:
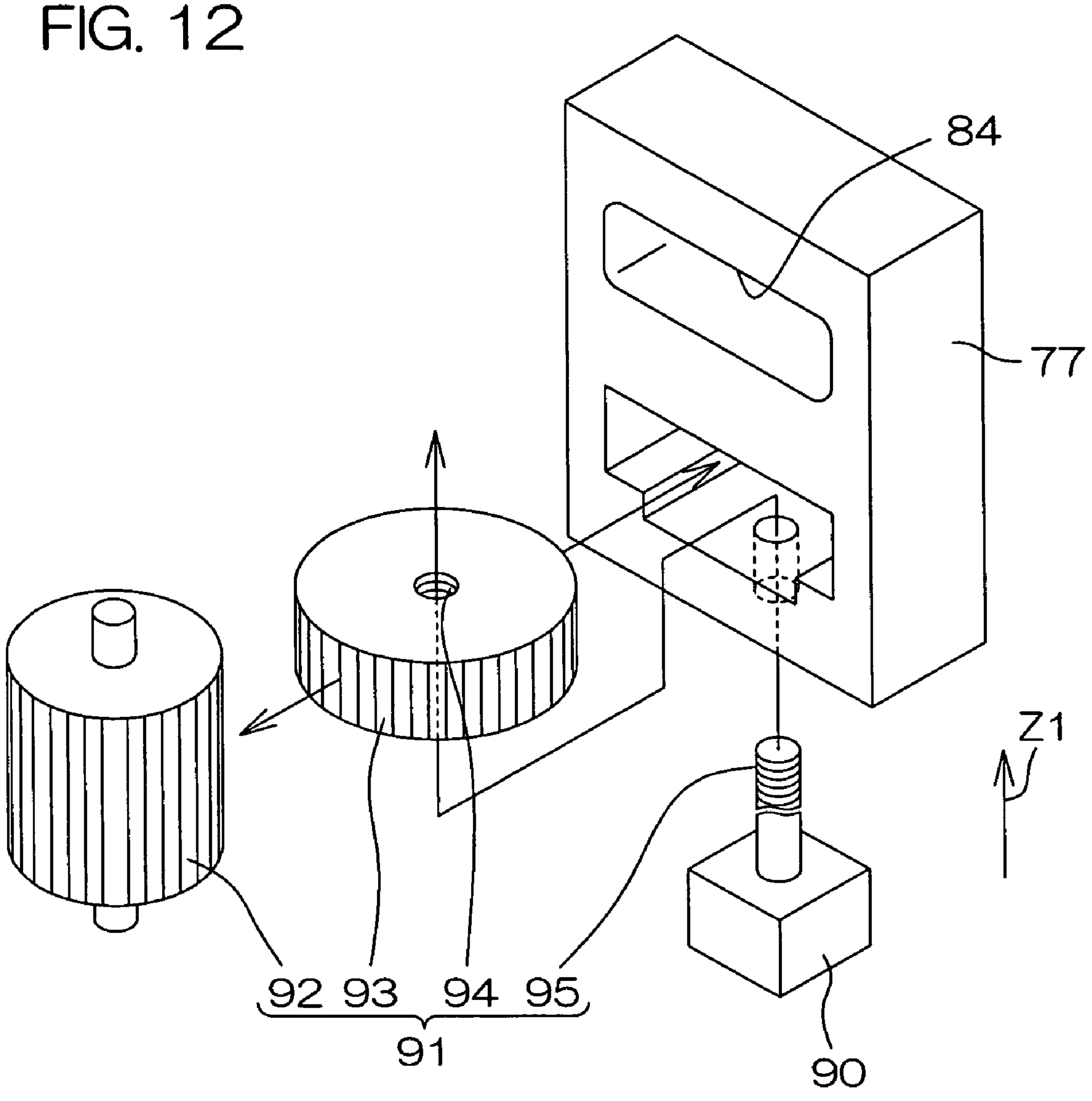
FIG. 12 is an exploded perspective view of a major portion in a crimp height adjusting mechanism shown in FIG. 10.
Figure 13B:
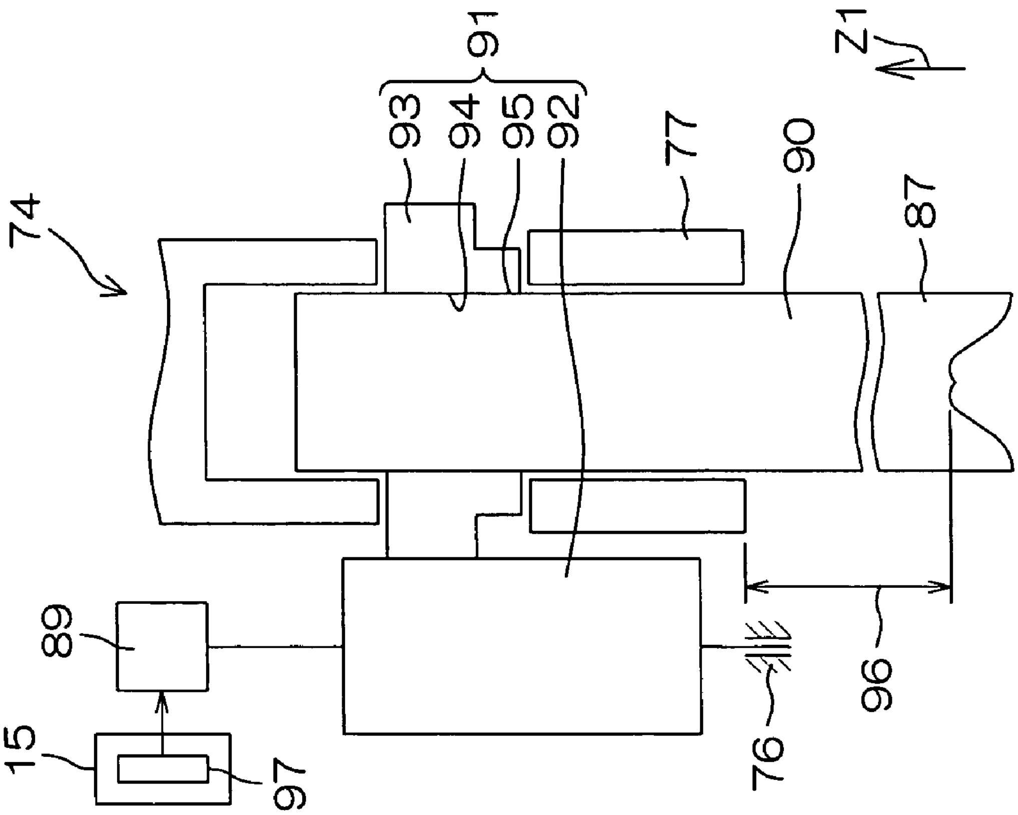
FIG. 13A and FIG. 13B are schematic views of the crimp height adjusting mechanism of FIG. 12, FIG. 13A showing a state where the crimp height is increased and FIG. 13B showing a state where the crimp height is reduced.
Figure 13A:
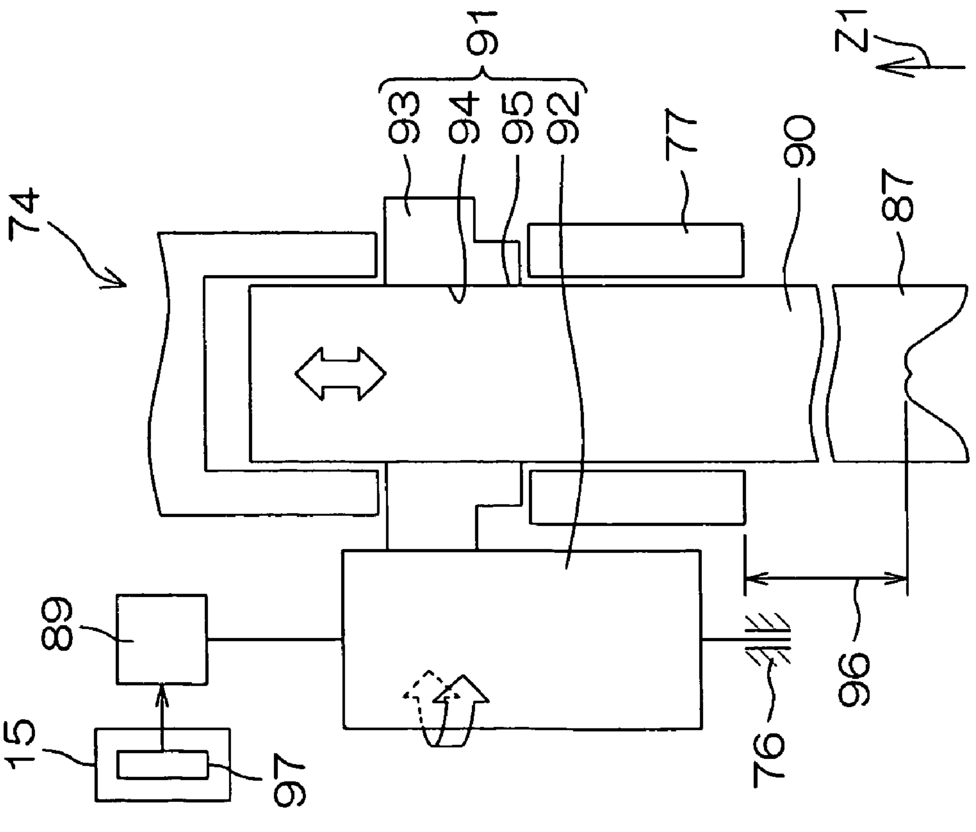

FIG. 12 is an exploded perspective view of a major portion of the crimp height adjusting mechanism 74. FIG. 13A and FIG. 13B are schematic views used to describe operations of the crimp height adjusting mechanism 74.

The linking portion 91 includes first and second spur gears 92 and 93 comprising a pair of straight spur gears that engage with each other. The first and second spur gears 92 and 93, being in the engaged state, are allowed to move relatively in the vertical direction Z1, which is the axial directions of both the gears 92 and 93, and they constitute a coupling joint. The first spur gear 92 has a relatively long face width in the vertical direction Z1. The second spur gear 93 has a relatively short face width in the vertical direction Z1. The first spur gear 92 is linked to the output shaft of the electric motor 89 to be driven by the electric motor 89, and is supported on the press housing 76 to be free to rotate. The second spur gear 93, being engaged with the first spur gear 92, is able to move in association with the first spur gear 92, and is attached to the press ram 77 to be allowed to rotate while its relative movements in a direction along which the rotation central axis line of the second spur gear 93 extends are restricted.

The linking portion 91 includes a female screw 94 formed on the inner surface of the second spur gear 93, and a male screw 95 threaded into the female screw 94 to be allowed to rotate integrally with the operating member 90. The female screw 94 and the male screw 95 together constitute a screw mechanism. The female screw 94 is provided to the second spur gear 93 to be allowed to rotate as one unit. Meanwhile, the male screw 95 is inhibited from rotating relatively with respect to the press ram 77 about its own central axis line. That is to say, relative rotations of the operating member 90 with respect to the press ram 77 about the central axis line of the male screw 95 are restricted.

When the output shaft of the electric motor 89 is rotated, the first spur gear 92 starts to rotate, which causes the second spur gear 93 engaging with the first spur gear 92 and the female screw 94 to rotate. The male screw 95, which is inhibited from rotating, thereby starts to move in the vertical direction Z1. As a result, the operating member 90 and hence the top force 87 of the crimping applicator 72 start to move along the vertical direction Z1. Also, the position of the operating member 90 in the vertical direction Z1 with respect to the press ram 77 is determined depending on the rotation angle position of the output shaft of the electric motor 89. The protruding length 96 of the top force 87 of the crimping applicator 72 protruding from the lower end of the press ram 77, and hence the dies interval 88 between the top force 87 and the bottom force 86 are thereby determined. In addition, the linking portion 91 is configured to maintain the position of the operating member 90 with respect to the press ram 77 even when the operating position 90 moves relatively along the vertical direction Z1 together with the press ram 77.

The control portion 15 also includes a control section 97 serving as a crimp height control unit to control the crimp height adjusting mechanism 74 depending on the kind of an electric wire H2 subject to crimping. The control section 97 receives a command signal from the CPU. The command signal contains the kind of an electric wire H2 onto which the terminal fitting H3 is to be crimped and the kind of the terminal fitting H3. The control section 97 sets the rotation angle position of the output shaft of the electric motor 89 to a predetermined position, so that an optimal caulking height and a corresponding dies interval can be obtained depending on the kind of the electric wire H2 and the kind of the terminal fitting H3 specified in the command signal. The predetermined position is selected from plural pre-stored positions to best suit the kind of the electric wire H2 and the kind of the terminal fitting H3. By controlling the rotation angle position of the output shaft of the electric motor 89 to be at the selected predetermined position, it is possible to adjust the protruding length 96 of the top force 87 protruding from the press ram 77 to a predetermined value via the linking portion 91. After the adjustment, the rotation shaft of the electric motor 89 is stopped and the rotation angle position is determined, which in turn positions the operating member 90 and the top force 87 with respect to the press ram 77. The dies interval 88 and hence the caulking height can thus reach adequate values when the press ram 77 is moved to the lower dead point by the press mechanism 73 while the positions are determined as described above.

The crimp height adjusting mechanism 74 configured in this manner is able to adjust the dies interval 88 of the crimping applicator 72 to be an optimal distance, which in turn makes it possible to set the caulking height to an optimal value depending on the size of the electric wire H2 and the size of the terminal to be crimped.

Figure 14B:
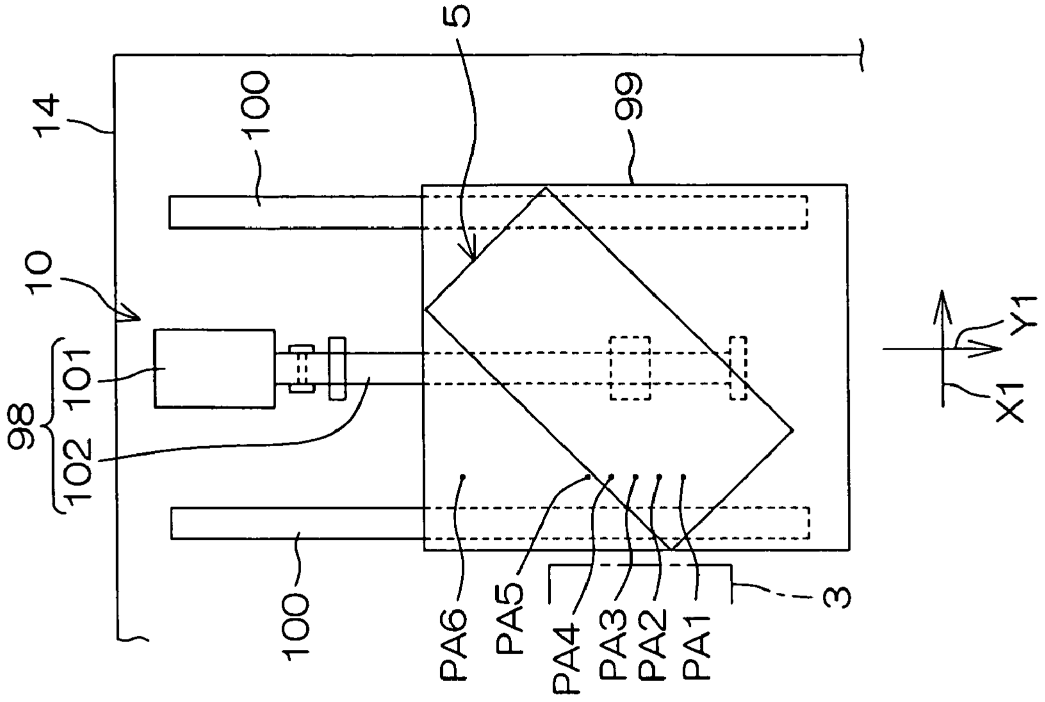
FIG. 14A and FIG. 14B are plan views of a terminal crimping portion and a crimping portion moving mechanism shown in FIG. 2, FIG. 14A showing a state at a retraction position and FIG. 14B showing a state at a crimping position.
Figure 14A:
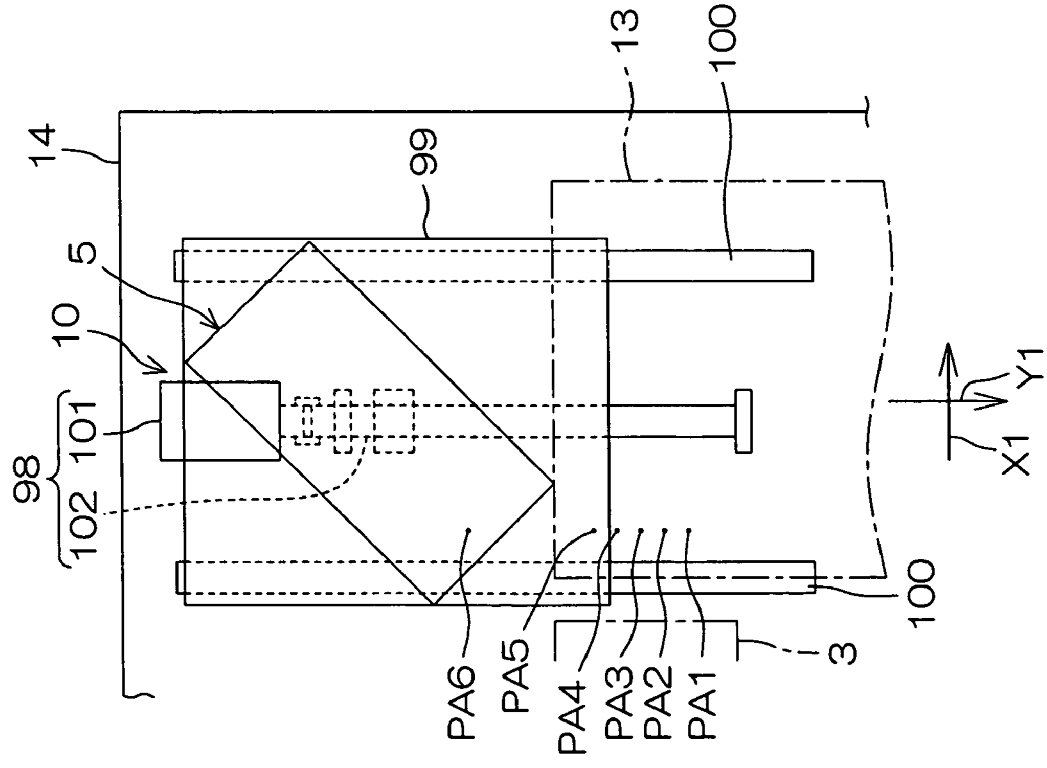

FIG. 14A and FIG. 14B are plan views of the terminal crimping portion 5 and the crimping portion moving mechanism 10.

The terminal crimping portion 5 crimps terminal fittings H3 successively onto the end portions H7 of the electric wires H2 at the crimping positions PA1, PA2, and so forth. The terminal crimping portion 5 is thus provided in such a manner that it is allowed to move by the crimping portion moving mechanism 10 along the longitudinal direction Y1, which is a predetermined crimping portion moving direction that intersects with a direction along which the electric wire H2 extends, with respect to the end portions H7 of the electric wires H2 held by the electric wire holding portion 3 at the crimping positions PA1, PA2, and so forth.

The crimping portion moving mechanism 10 has a driving mechanism 98 to generate a driving force, a moving stand 99 serving as a moving member driven by the driving mechanism 98 and supported on the base 14 to be free to move in the longitudinal direction Y1, and a linear moving bearing 100 serving as a guiding portion to guide the moving stand 99 along the longitudinal direction Y1. The moving stand 99 is supported on the base 14 via the linear moving bearing 100 to be free to move.

The driving mechanism 98 has an electric motor 101 serving as a driving source, and a transmission mechanism 102 to transmit a driving force from the electric motor 101 to the moving stand 99. The electric motor 101 comprises, for example, a stepping motor, and is able to control a quantity of rotation angle, a rotation angle position, and a rotation direction of the output shaft by means of the control portion 15. The transmission mechanism 102 comprises a ball screw mechanism, and converts rotations of the output shaft 101 to linear movements.

The crimping portion moving mechanism 10 is able to place the moving stand 99 at a desired position by controlling the rotation angle position of the output shaft of the electric motor 101. For example, it can place the terminal crimping portion 5 at any of plural crimping positions PA1, PA2 and so forth or at the retraction position PA6. Also, as will be described below, the crimping portion moving mechanism 10 is configured in such a manner that when the terminal crimping portion 5 is placed at the retraction position PA6, the electric wires H2 fed from the electric wire holding portion 3 by the predetermined length are received by the mount stand 13.

Figure 15:
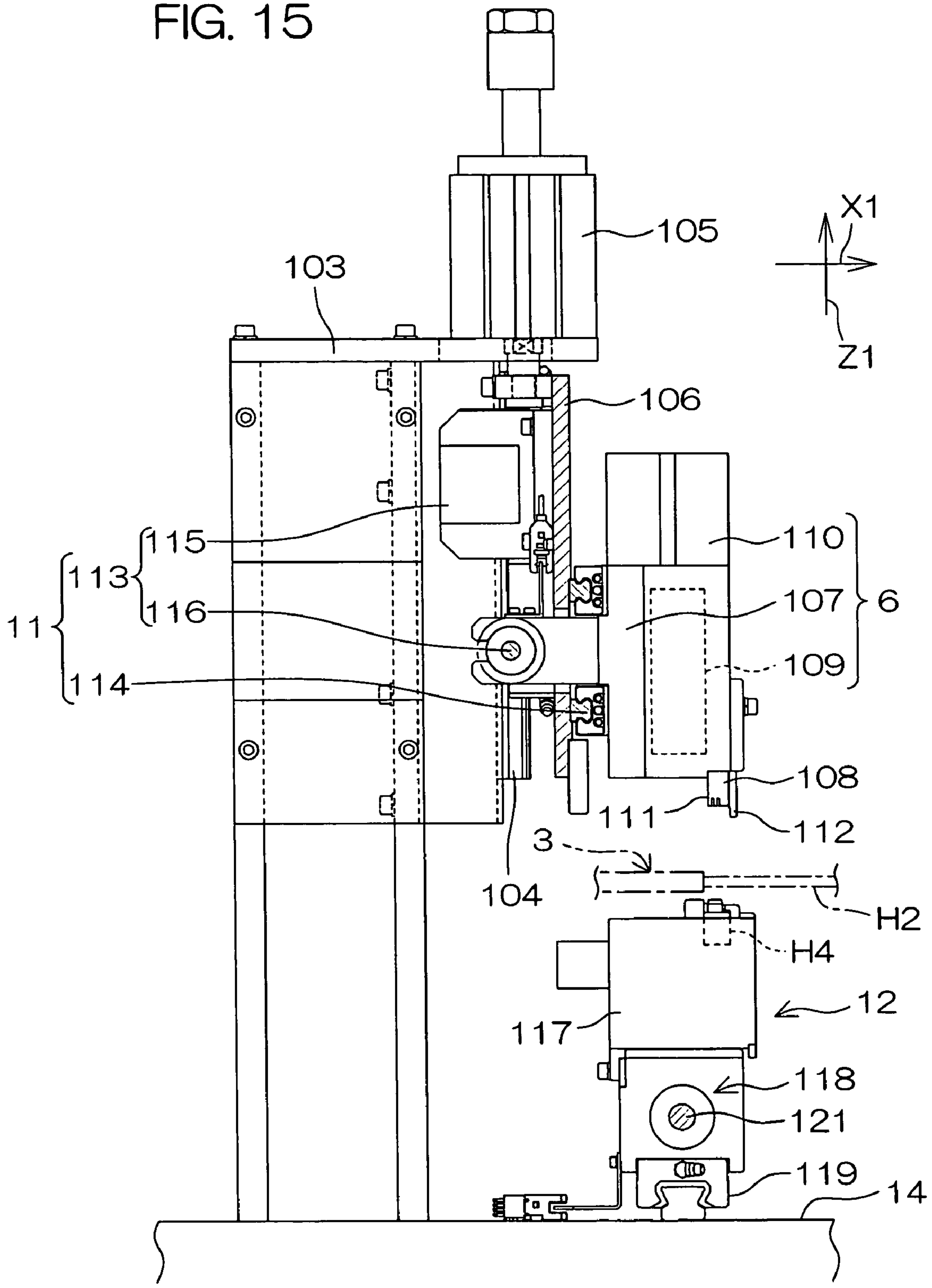
FIG. 15 is a partial sectional front view of an insulation displacement termination portion and an insulation displacement termination connector moving mechanism shown in FIG. 2, and shows a cross section taken along the line XV-XV of FIG. 16.
Figure 16:
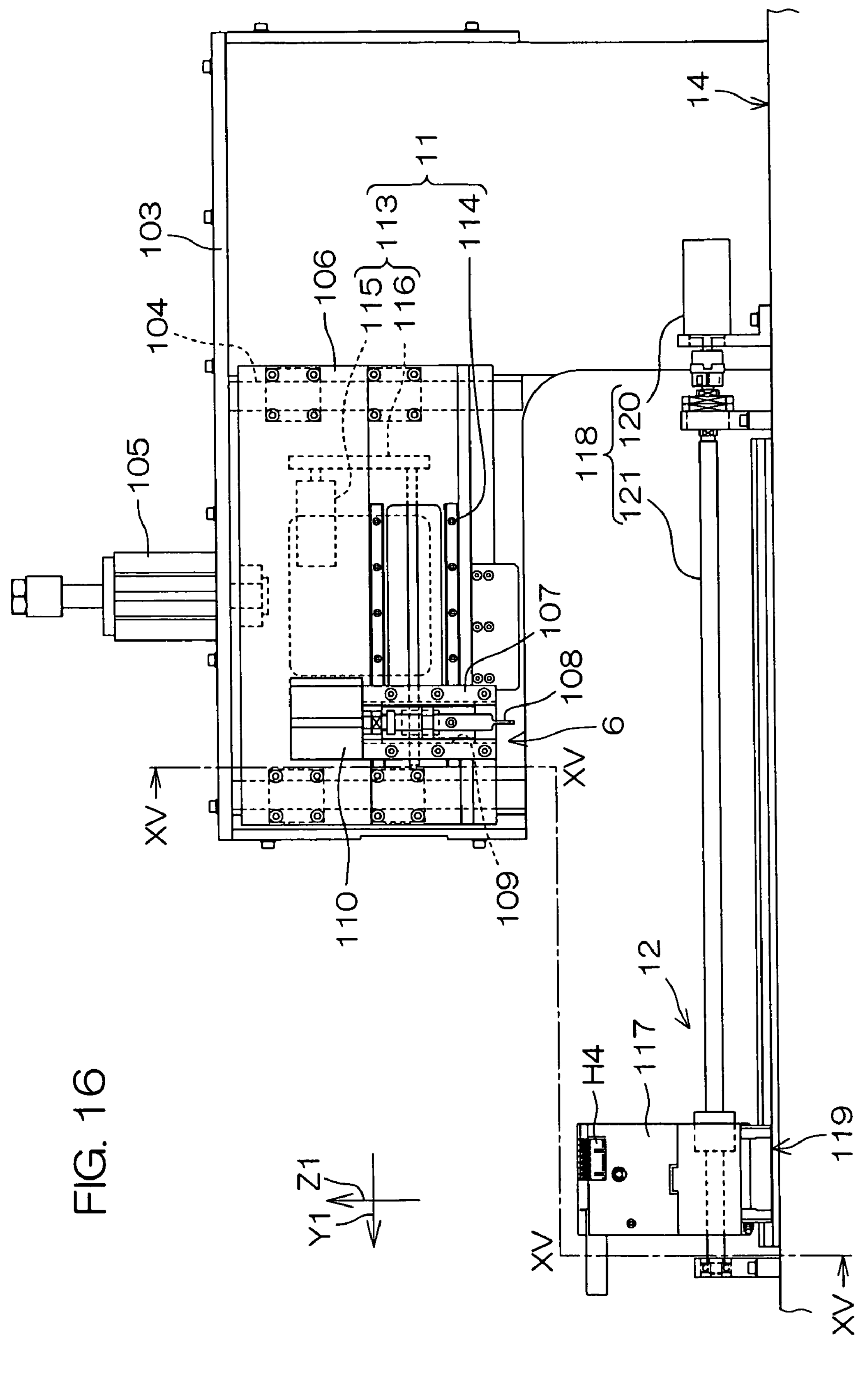
FIG. 16 is a side view of the insulation displacement terminating portion and the insulation displacement termination connector moving mechanism of FIG. 15.
Figure 17A:
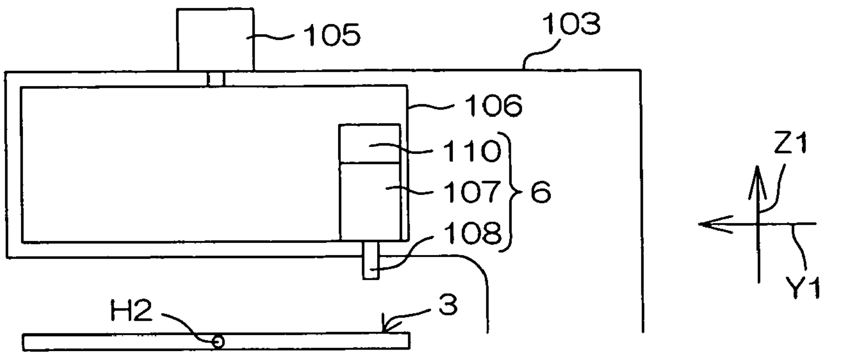
FIGS. 17A through FIG. 17D are schematic views showing operations of the insulation displacement terminating portion and the insulation displacement terminating portion moving mechanism of FIG. 15 by following a work procedure.
Figure 17B:
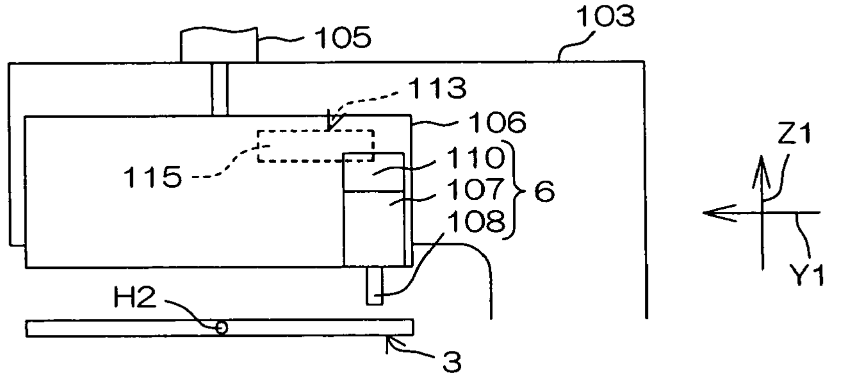
Figure 17C:
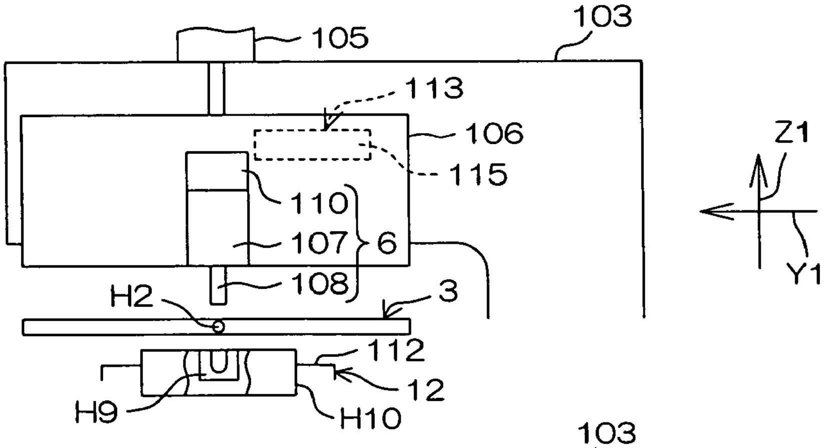
Figure 17D:
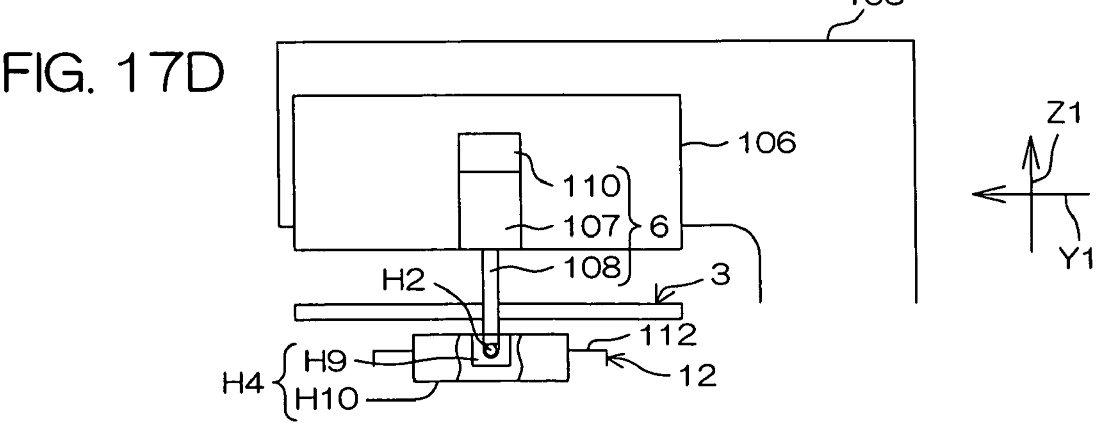

FIG. 15 and FIG. 16 are, respectively, a partial sectional front view and a side view of the insulation displacement terminating portion 6, the insulation displacement terminating portion moving mechanism 11, the insulation displacement termination connector moving mechanism 12, etc. FIGS. 17A through 17D and FIGS. 18A through 18C, which are schematic views used to describe operations of the respective portions, will be referred to as the need arises.

In order to support the insulation displacement terminating portion 6, the manufacturing device 1 of an electric wire with terminal has a first supporting member 103 fixed to the base 14, a second supporting member 106 linked to the first supporting member 103 via a linear moving bearing 104 and a driving mechanism 105 to be allowed to move linearly in the vertical direction Z1, and a third supporting member 107 linked to the second supporting member 106 via the insulation displacement terminating portion moving mechanism 11 to be allowed to move linearly in the longitudinal direction Y1.

The driving mechanism 105 comprises a hydropneumatic actuator serving as a driving source, for example, a pneumatic power cylinder. By controlling the flow of a high pressure air through a pair of air chambers in the pneumatic power cylinder under the control of the control portion 15, the output portion of the pneumatic power cylinder is allowed to move linearly. The second supporting member 106 thereby moves along the vertical direction Z1 with respect to the first supporting member 103, which allows the second supporting member 106, the insulation displacement terminating portion 6, etc. to retract from the electric wire holding portion 3 (see FIG. 17A and FIG. 17B).

The insulation displacement terminating portion 6 has an insulation displacement termination punch 108 to push an electric wire H2 into the insulation displacement termination terminal H9 in the insulation displacement termination connector H4, a guiding portion 109 to guide the movements of the insulation displacement terminating punch 108 along the vertical direction Z1, which is a predetermined insulation displacement terminating direction, and a driving mechanism 110 to move the insulation displacement terminating punch 108 along the insulation displacement terminating direction. The insulation displacement terminating punch 108 is linked to the third supporting member 107 via the driving mechanism 110 and the guiding portion 109 to be allowed to move in the vertical direction Z1.

The insulation displacement terminating punch 108 is provided with a cutting blade 111 to cut the electric wire H2 to be insulation displacement terminated prior to insulation displacement termination, and an abutting portion 112 to hold the electric wire H2 to be insulation displacement terminated by pushing and pressing against the electric wire H2. The cutting blade 111, the insulation displacement terminating punch 108, and the abutting portion 112 are aligned along the transverse direction X1. The cutting blade 111 is provided adjacently to the insulation displacement terminating punch 108 on the left side to be allowed to move integrally with the insulation displacement terminating punch 108. The abutting portion 112 protrudes downward to be lower than the insulation displacement terminating punch 108, and is provided adjacently to the insulation displacement terminating punch 108 on the right side, that is, on the terminal fitting H3 side, along the direction of the electric wire H2.

The driving mechanism 110 comprises a hydropneumatic actuator serving as a driving source, for example, a pneumatic power cylinder. By controlling the flow of a high pressure air through a pair of air chambers in the pneumatic power cylinder under the control of the control portion 15, the output portion of the pneumatic power cylinder is allowed to move linearly. This allows the insulation displacement terminating punch 108 to move in the vertical direction Z1 with respect to the third supporting member 107 (see FIG. 17C and FIG. 17D, and FIG. 18B and FIG. 18C).

Prior to the insulation displacement termination, the electric wire H2 is fed by the predetermined length from the electric wire holding portion 3 as will be described below, and under this condition, the electric wire holding portion 3 moves to the first position PD1, which is a retraction position retracted leftward from the crimping positions PA1, PA2, and so forth. At the first position PD1, the electric wire holding portion 3 holds the electric wires H2 at predetermined insulation displacement termination positions PB1, PB2, and so forth, which are positions in close proximity to the electric wire holding portion 3. Portions to be insulation displacement terminated of the electric wires H2, which have been previously determined, are positioned at the insulation displacement termination positions PB1, PB2, and so forth, so that the portions to be insulation displacement terminated of the electric wires H2 are insulation displacement terminated to the insulation displacement termination connector H4 by the insulation displacement terminating portion 6.

To be more concrete, the cutting blade 111, the insulation displacement terminating punch 108, and the abutting portion 112 are descended by the driving mechanism 110 of the insulation displacement terminating portion 6. The abutting portion 112 first abuts on held portions (portions adjacent to the right side, which are closer to the terminal fittings H3 than the portions to be insulation displacement terminated) of the electric wires H2 and thereby holds the electric wires H2. The cutting blade 111 and the electric wire holding portion 3 then cut cutting portions (portions adjacent to the left side, which are farther from the terminal fittings H3 than the portions to be insulation displacement terminated) of the electric wires H2 in cooperation. Subsequently, the insulation displacement terminating punch 108 pushes the portions to be insulation displacement terminated (equivalent to the cutting ends) of the electric wires H2 held by the abutting portion 112 into the insulation displacement termination terminals H9 in the insulation displacement termination connector H4, and stops at a predetermined lower stop position (see FIG. 17D and FIG. 18C). When the insulation displacement terminating punch 108 descends to the predetermined lower stop position, the coating portions H6 on the portions to be insulation displacement terminated of the electric wires H2 are broken. The core wires H5 and the insulation displacement termination terminals H9 are thus insulation displacement terminated and become electrically conductive.

Figure 18A:
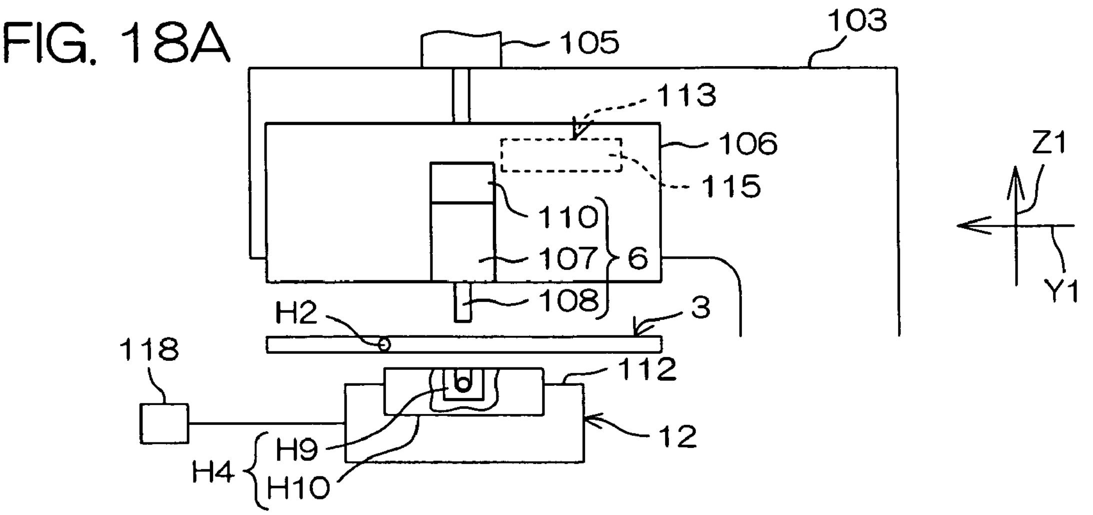
FIGS. 18A through 18C are schematic views showing operations of the insulation displacement terminating portion and the insulation displacement terminating portion moving mechanism of FIG. 15, continuing from FIG. 17D, by following the work procedure.
Figure 18B:
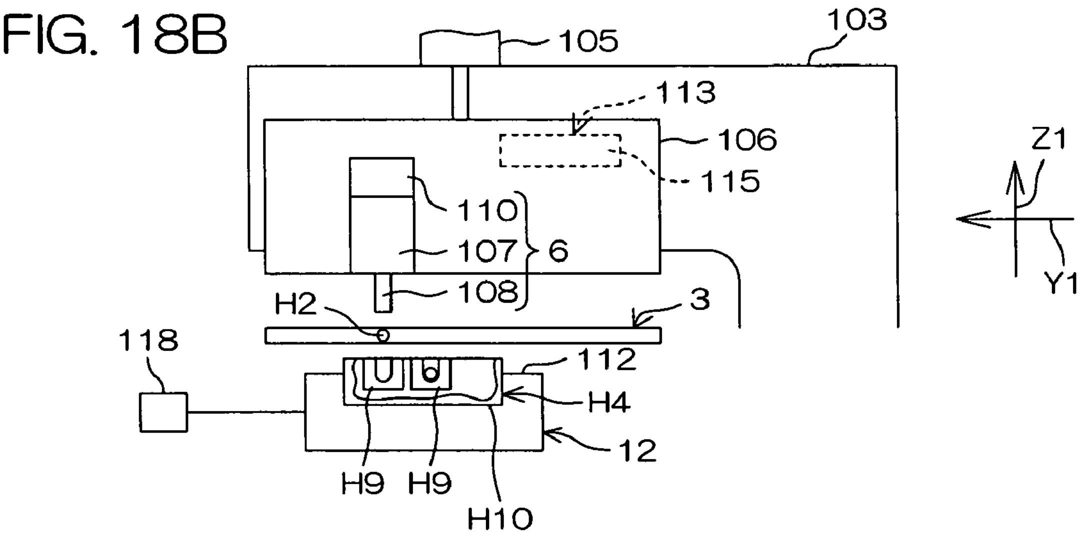
Figure 18C:
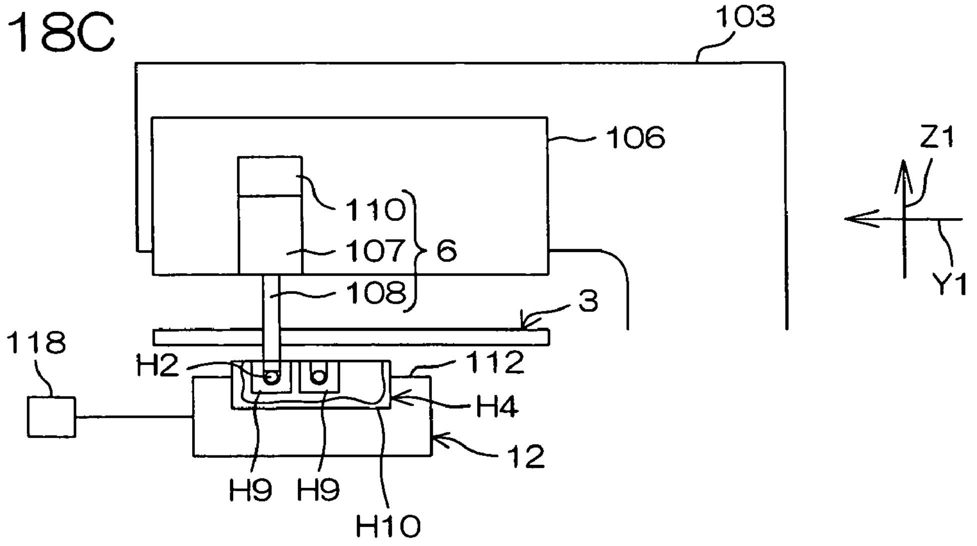

After the insulation displacement termination, the insulation displacement terminating punch 108, the cutting blade 111, and the abutting portion 112 are ascended by the driving mechanism 110 of the insulation displacement terminating portion 6, and they stop when they are returned to the upper stop position (see FIG. 18A).

The insulation displacement terminating portion moving mechanism 11 has a driving mechanism 113 to generate a driving force, and a linearly moving bearing 114 serving as a guiding portion driven by the driving mechanism 113 to guide the third supporting portion 107 along the longitudinal direction Y1 with respect to the second supporting member 106 as the fixed end member. The insulation displacement terminating portion moving mechanism 11 is able to move the insulation displacement terminating portion 6 along the longitudinal direction Y1, which is a direction parallel to the crimping portion moving direction.

The driving mechanism 113 includes an electric motor 115 serving as a driving source, and a transmission mechanism 116 to transmit a driving force from the electric motor 115 to the moving stand 17.

The electric motor 115 comprises, for example, a stepping motor, and is supported on the second supporting member 106. A quantity of rotation angle, a position of the rotation angle, and a rotation direction of the output shaft of the electric motor 115 can be controlled by the control portion 15.

The transmission mechanism 116 has a belt mechanism and a ball screw mechanism. The output shaft of the electric motor 115 is linked to the screw shaft of the ball screw mechanism via the belt mechanism to be allowed to move in association with the screw shaft. The screw shaft of the ball screw mechanism is supported on the second supporting member 106 to be free to rotate, and a nut is screwed therein. The nut of the ball screw mechanism is attached to the third supporting member 107 to be allowed to move as one unit. Rotations of the output shaft of the electric motor 115 are converted to linear movements and transmitted to the third moving member 107.

By controlling the rotation angle position of the output shaft of the electric motor 115 to a desired position, it is possible to place the third supporting member 107, and hence the insulation displacement terminating punch 108, the cutting blade 111, and the abutting portion 112 at any desired position along the longitudinal direction Y1. For example, it is possible to place the insulation displacement terminating punch 108 in the longitudinal direction Y1 at the insulation displacement termination positions PB1, PB2, and so forth for the plural electric wires H2 held by the electric wire holding portion 3.

The insulation displacement termination connector moving mechanism 12 has a holding portion 117 to receive the insulation displacement termination connector H4 in a re-attachable manner in an upward direction while restricting its movements in the longitudinal and transverse directions Y1 and X1, a driving mechanism 118 to generate a driving force to move the holding portion 117, and a linearly moving bearing 119 serving as a guiding portion to guide the holding portion 117 along the longitudinal direction Y1.

The holding portion 117 holds the insulation displacement termination connector H4 in such a manner that a direction along which plural insulation displacement termination terminals H9 are aligned at regular pitches goes along the longitudinal direction Y1, which is the crimping portion moving direction. The insulation displacement termination connector moving mechanism 12 is able to move the insulation displacement termination connector H4 held by the holding portion 117 along the longitudinal direction Y1, which is the crimping portion moving direction and the direction along which the insulation displacement termination terminals H9 are aligned (see FIG. 17B and FIG. 17C, and FIG. 18A and FIG. 18B).

The driving mechanism 118 has an electric motor 120 serving as a driving source, and a transmission mechanism 121 to transmit a driving force from the electric motor 120 to the holding portion 117.

The electric motor 120 comprises, for example, a stepping motor, and is able to control a quantity of rotation angle, a rotation angle position, and a rotation direction of the output shaft by means of the control portion 15.

The transmission mechanism 121 comprises a ball screw mechanism, and is able to transmit rotations of the output shaft of the electric motor 120 to the holding portion 117 by converting the rotations to linear movements.

The insulation displacement termination connector moving mechanism 12 is able to place the holding portion 117 at any desired position along the longitudinal direction Y1 by controlling the rotation angle position of the output shaft of the electric motor 120 to be at a desired position. This causes the insulation displacement termination connector H4 to move along the longitudinal direction Y1 via the holding portion 117, so that the insulation displacement termination terminals H9 in the insulation displacement termination connector H4 are placed at the corresponding predetermined positions, for example, positions directly below the insulation displacement termination positions PB1, PB2, and so forth for the electric wires H2 corresponding to the insulation displacement termination terminals H9 (see FIG. 18A and FIG. 18B).

The insulation displacement termination connector moving mechanism 12 is able to place the holding portion 117 at the take-out position PB6 present outside the working area P1, at which the insulation displacement termination connector H4 is attached to/removed from the holding portion 117. FIG. 16 shows the holding portion 117 positioned at the take-out position PB6.

The control portion 15 includes a micro computer (referred to also as CPU) serving as a control center, and the wire harness H1 is manufactured by a manufacturing method described below by following a program pre-installed in a memory device, such as a RAM and a ROM.

An input portion (not shown) to input specifications of the wire harness H1 is connected to the control portion 15. Information, such as the number of electric wires H2, the specifications of respective electric wires H2, for example, the thickness and length of the core wire H5, the kind of a corresponding terminal fitting H3, the positions of respective electric wires H2 in the insulation displacement termination connector H4, and the need for crimping, is inputted through the input portion. The information is inputted in connection with the grooves 19, which are the positions in the electric wire holding portion 3 at which plural electric wires H2 are held independently. For example, information indicating that an electric wire H2 of a first kind is held in the foremost groove 19 in the electric wire holding portion 3, and information specifying the values of the diameter and length of the core wire H5 of this electric wire H2, the kind of the terminal fitting H3, and to what number of the insulation displacement termination terminal H9 from the front of the insulation displacement termination connector H4 the electric wire H2 is to be insulation displacement terminated, are inputted.

In order to control the plural electric motors 31, 47, 58, 78, 89, 101, 115, and 120 described above, the control portion 15 is connected to each of these plural electric motors 31 and so forth via a driving circuit (not shown). Each electric motor may comprise a stepping motor, or a servo motor and a position detector to detect a position of a member that moves in association with the output shaft of the servo motor.

In order to control the plural hydropneumatic actuators described above, for example, the pneumatic power cylinders, the control portion 15 is connected to each of plural solenoid valves via a driving circuit. By opening/closing a desired solenoid valve at desired timing, it is possible to control operations of a desired hydropneumatic actuator.

Hereinafter, descriptions will be given in a case where the wire harness H1 shown in FIG. 1 is manufactured. The wire harness H1 has five electric wires H2 each comprising a coated electric wire, five terminal fittings H3 respectively crimped onto one ends of the five electric wires H2, and one insulation displacement termination connector H4 insulation displacement terminated to the other ends of the five electric wires H2. In the insulation displacement termination connector H4, five insulation displacement termination terminals H9 to be insulation displacement terminated respectively to the other ends of the five electric wires H2 are accommodated in the connector housing H10. The five electric wires H2 include plural kinds, for example, two kinds of electric wires H2, and an adequate caulking height of the terminal fitting H3 varies from kind to kind of the electric wires H2. Also, the five electric wires H2 include electric wires H2 of two different lengths. Further, the plural electric wires H2 are held successively by the grooves 19 in the electric wire holding portion 3 from the foremost groove 19.

The wire harness H1 is manufactured by following the procedure of the manufacturing method described below as the control portion 15 controls the respective portions described above.

Figure 19:
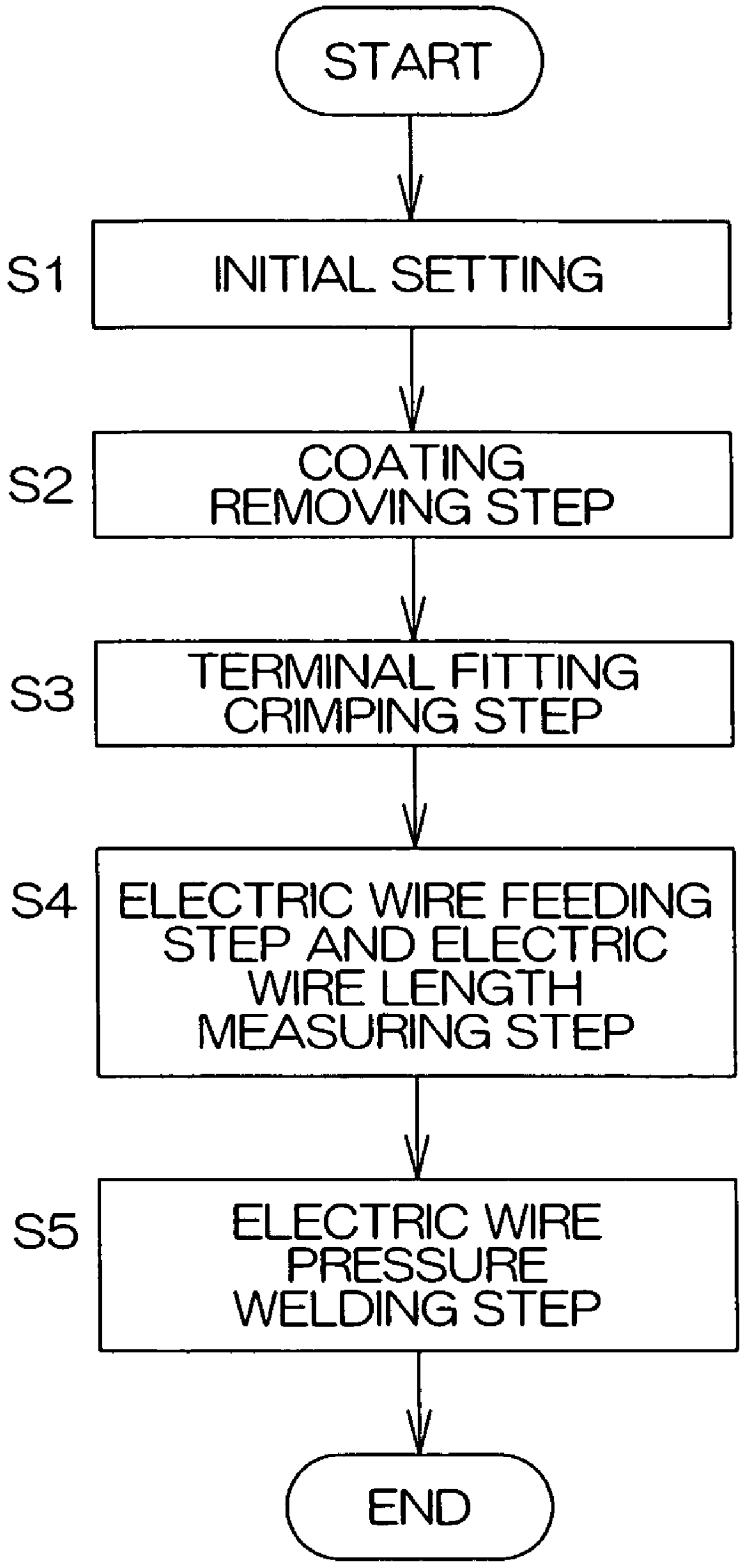
FIG. 19 is a flowchart of a control portion in the manufacturing device of an electric wire with terminal of FIG. 2, and shows the entire work.

The flowchart of FIG. 19 will now be referred to.

An overall flow of the work will be described first. The initial setting (Step S1) is performed prior to the work, and a coating removing step (Step S2) is performed next. In this step, the coating portions H6 on the end portions H7 of the plural electric wires H2 are removed using the strip blades 49 and 50. Subsequently, a terminal fitting crimping step (Step S3) is performed. In this step, plural terminal fittings H3 are successively crimped onto the end portions H7 of the plural electric wires H2 from which the coating portions H6 have been removed. An electric wire feeding step and an electric wire length measuring step (Step S4) are performed next. The two steps in Step S4 are performed concurrently; the plural electric wires H2 are fed from the electric wire holing portion 3 while at the same time a quantity of feeding of each electric wire H2 being fed is measured. This makes it possible to feed plural electric wires H2 independently from the electric wire holding portion 3 by their respective predetermined lengths that have been previously inputted. Subsequently, an insulation displacement terminating step (Step S5) is performed. In this step, the plural electric wires H2 are insulation displacement terminated commonly to the insulation displacement termination connector H4.

FIG. 2 and FIG. 3 will now be referred to. At the initial setting in Step S1, plural electric wires H2 are held at predetermined positions by the predetermined grooves 19 in the electric wire holding portion 3. For example, the tip end of the end portion H7 of each electric wire H2 is positioned to coincide with the end of the electric wire holding portion 3, and the plural electric wires H2 are stopped by the first and second stopping mechanisms 20 and 21. The electric wire holding portion advancing/retracting mechanism 7 places the electric wire holding portion 3 at the first position PD1. The strip mechanism 4 and the terminal crimping portion 5 are placed at the corresponding retraction positions PE2 and PA6, respectively. The insulation displacement terminating portion 6 is placed at the rearmost position above.

Figure 20:
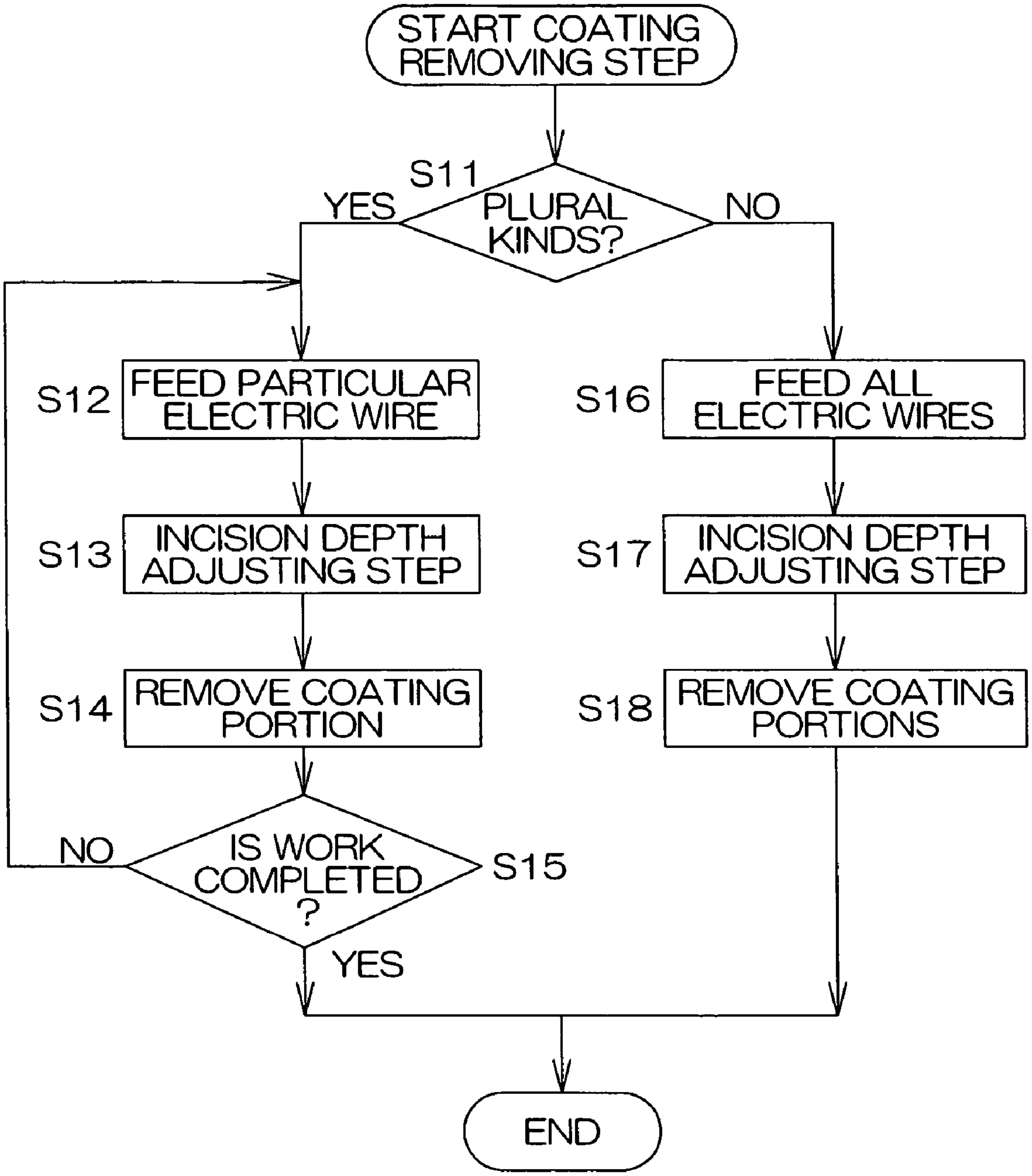
FIG. 20 is a flowchart of a coating removing step shown in FIG. 19.

FIG. 20 is the flowchart detailing the coating removing step. FIGS. 21A through 21E are schematic views used to describe operations of the strip mechanism 4.

In the coating removing step in Step S2, the strip mechanism 4 is placed at the processing position PE1 while maintaining the largest interval between the strip blade 49 and the strip blade 50 in the strip mechanism 4.

Whether plural electric wires H2 from which the coating portions H6 are to be removed include plural kinds of electric wires H2 is judged (Step S11). This judgment is made by the control portion 15 on the basis of information that has been previously inputted.

Figure 21A:
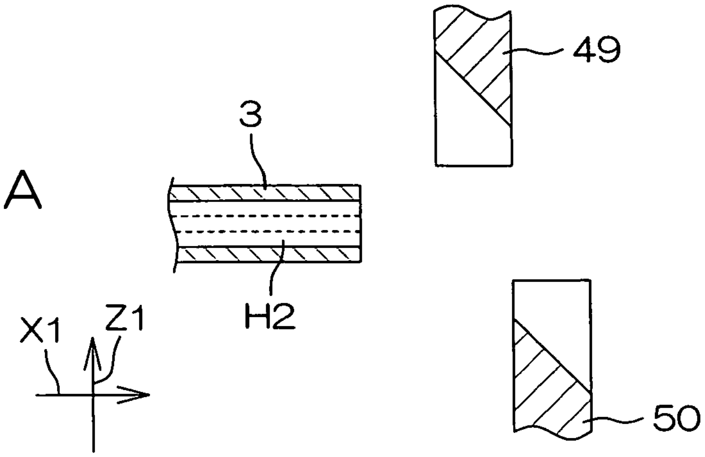
FIGS. 21A through 21E are schematic views showing operations of the strip mechanism in the coating removing step of FIG. 20 by following a work procedure.
Figure 21B:
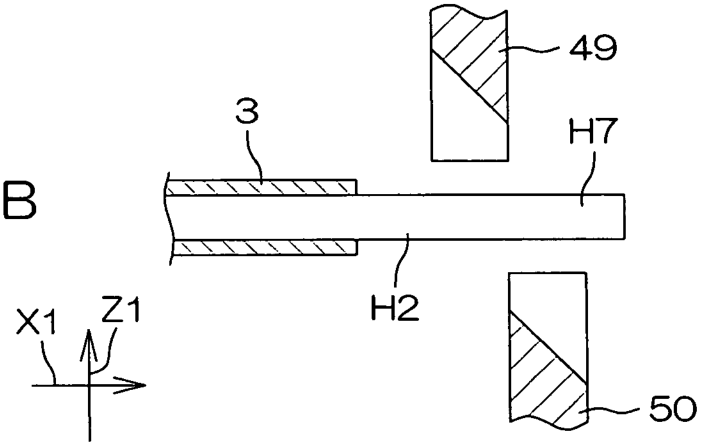
Figure 21C:
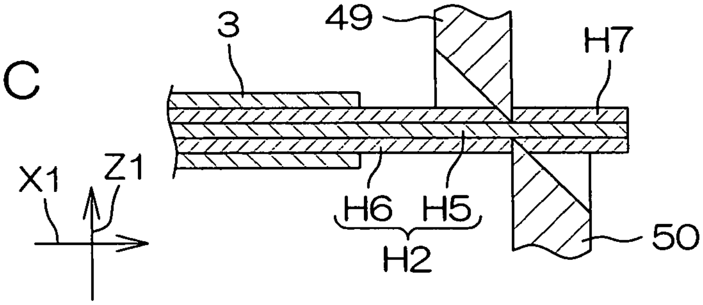

When plural kinds of electric wires H2 are included (YES in Step S11), the electric wire holding portion advancing/retracting mechanism 7 moves the electric wire holding portion 3 to the second position PD2 (see FIG. 21A) A particular electric wire H2, that is, one or more than one electric wire H2 of the first specification from which the coating portion H6 is to be removed, is fed by the electric wire feeding mechanism 8 by the predetermined length, and the end portion H7 of the electric wire H2 thus fed is placed at the strip position PC (see FIG. 21B). The rest of the electric wires H2 are stopped so as not to be fed. Thereafter, the electric wire holding portion 3 stops all the electric wires H2 (Step S12).

Subsequently, an incision depth adjusting step, included in the coating removing step, is performed, in which the incision depth L2 to be made by the strip blades 49 and 50 is adjusted depending on the kind of the electric wire H2 from which the coating portion H6 is to be removed (Step S13). In the incision depth adjusting step, the strip mechanism 4 is controlled by the control section 67 of the control portion 15, so that the strip blade 49 and the strip blade 50 cut in the coating portion H6 of the electric wire H2 in the predetermined incision depth L2 matching with the first specification (see FIG. 21C).

Figure 21D:
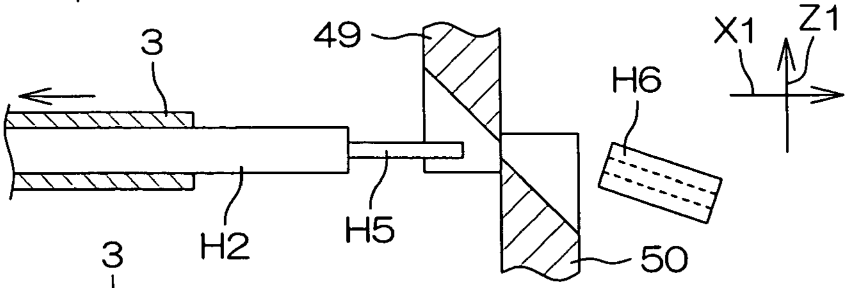

Subsequently, the electric wire holding portion advancing/retracting mechanism 7 pulls all the electric wires H2 together with the electric wire holding portion 3 by moving the electric wire holding portion 3 to a position spaced apart leftward from the second position PD2, for example, to the first position PD1, while all the electric wires H2 are being stopped (see FIG. 21D). This causes the coating portion H6 to be removed from the electric wire H2 of the first specification in which an incision has been made by a pair of the strip blades 49 and 50 (Step S14).

Figure 21E:
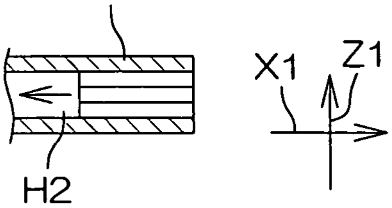

After the coating portion H6 is removed, the electric wire H2 of the first specification from which the coating portion H6 has been removed is fed inversely to the direction in Step S12 by the predetermined length fed in Step S12 by the electric wire feeding mechanism 8 (See FIG. 21E). Thereafter, the strip mechanism 4 opens the strip blade 49 and the strip blade 50 at the largest interval.

In Step S15, whether the work has been completed for all the electric wires H2 from which the coating portion H6 is to be removed is judged. In a case where there is an electric wire H2 from which the coating portion H6 is to be removed but has not been removed yet (NO in Step S15), the coating portion H6 is removed in the same manner as in Step S12 and onwards for the following second specification. The steps are repeated until the coating portions H6 are removed from all the electric wires H2 from which the coating portions H6 are to be removed. When the work is completed (YES in Step S15), the strip mechanism 4 is retracted to the retraction position PE2 by the strip mechanism moving mechanism 9. In a case where there is an electric wire H2 from which the coating portion H6 is not to be removed, the coating portions H6 are removed from all the electric wires H2 except this electric wire H2.

In Step S11, in a case where the electric wires H2 from which the coating portions H6 are to be removed are of one kind (NO in Step S11), the coating portions H6 are removed from all the electric wires H2 of this one kind from which the coating portions H6 are to be removed (Steps S16, S17, and S18). The strip mechanism 4 is then retracted to the retraction position PE2 by the strip mechanism moving mechanism 9.

Figure 22:
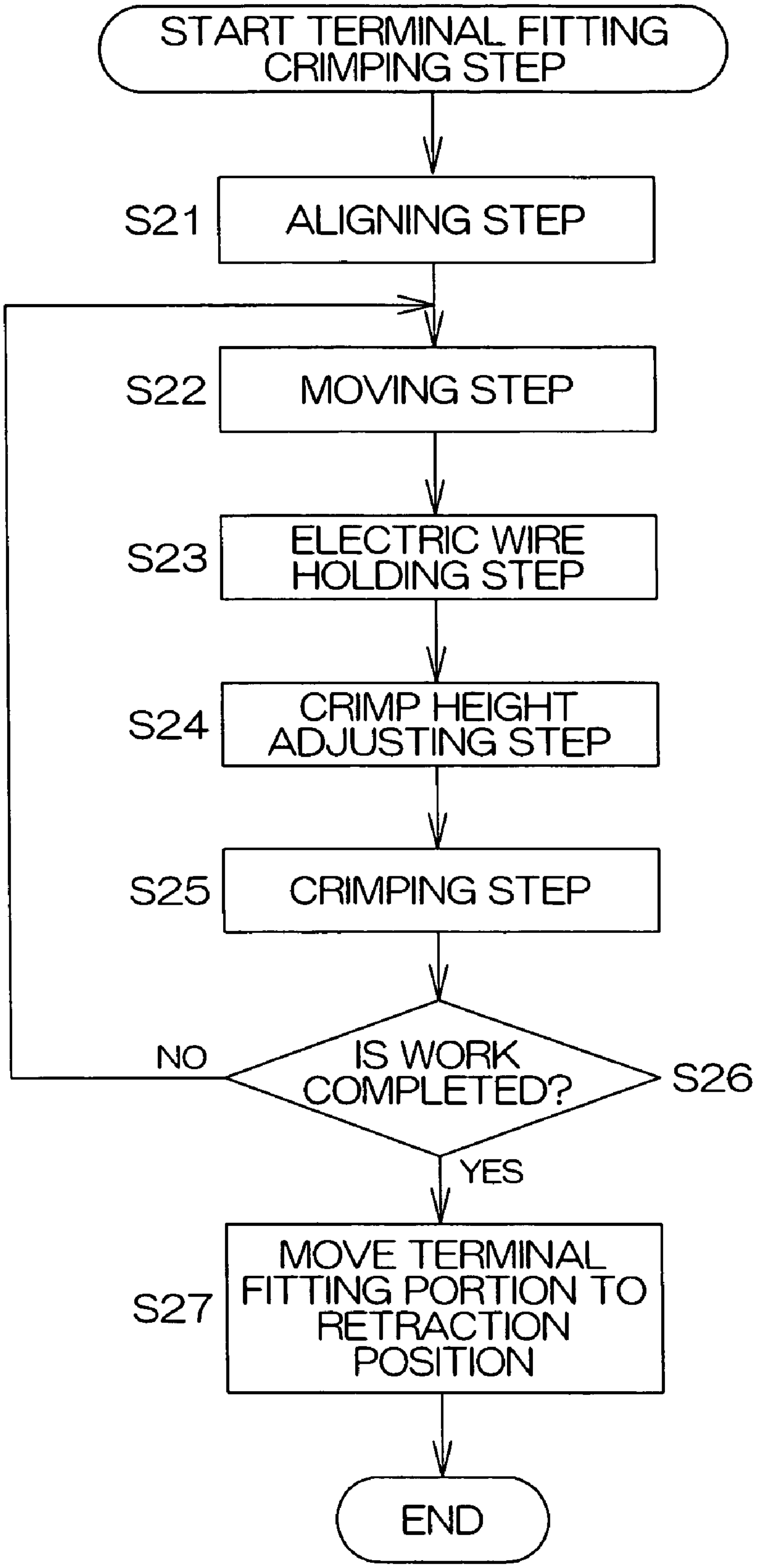
FIG. 22 is a flowchart of a terminal fitting crimping step shown in FIG. 19.

FIG. 22 is a flowchart detailing the terminal fitting crimping step. FIGS. 23A through 23I are schematic views used to describe operations of the terminal crimping portion 5.

In the terminal fitting crimping step in Step S3, the terminal fittings H3 are successively crimped onto plural electric wires H2 one by one. An alignment step is performed first for all the electric wires H2, so that the end portions H7 of the plural electric wires H2 are aligned along a predetermined straight line (referred to also as a crimping preparation line) (Step S21). To be more concrete, the electric wire holding portion 3 is placed at the third position PD3 by the electric wire holding portion advancing/retracting mechanism 7 to bring the tip ends of the end portions H7 of all the electric wires H2 into coincidence with the end portion of the electric wire holding portion 3, so that all the electric wires H2 are stopped by the electric wire holding portion 3 along the crimping preparation line. The crimping preparation line is set to extend along the longitudinal direction Y1, which is the crimping portion moving direction. Also, the terminal crimping portion 5 is present at the retraction position PA6 (see FIG. 23A).

Subsequently, a moving step (Step S22) is performed, in which the terminal crimping portion 5 is moved to the crimping positions PA1, PA2, and so forth corresponding to the plural electric wires H2 along a direction parallel to a crimping line PA7 (equivalent to the crimping portion moving direction), and movements of the terminal crimping portion 5 are stopped at each of the crimping positions PA1, PA2, and so forth corresponding to the plural electric wires H2 by the crimping portion moving mechanism 10.

Subsequently, a heterogeneous electric wire holding step is performed as an electric wire holding step, in which the end portions H7 of plural electric wires H2 of plural kinds are held at the corresponding crimping positions PA1, PA2, and so forth on the crimping line PA7 (Step S23).

Subsequently, a crimp height adjusting step is performed to adjust the crimp height depending on the kinds of the electric wires H2 at each of the crimping positions PA1, PA2, and so forth (Step S24).

Subsequently, a crimping step is performed to crimp the terminal fitting H3 to the end portion H7 of the electric wire H2 at each of the crimping positions PA1, PA2, and so forth at which the terminal crimping portion 5 stops in the moving step (Step S25).

These four steps, including the moving step, the heterogeneous electric wire holding step, the crimp height adjusting step, and the crimping step, are performed successively for all the electric wires H2 one by one. For example, these four steps are performed for the electric wire H2 placed in the foremost in the electric wire holding portion 3, then these four steps are performed for the electric wire H2 held adjacently behind the foremost electric wire H2, and thereafter these four steps are performed for the rest of the electric wires H2 one by one until these four steps are performed for the rearmost electric wire H2. The crimp height adjusting step may be performed as the need arises.

Figure 23A:
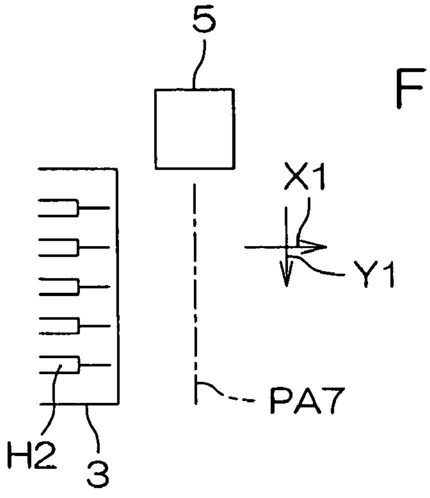
FIGS. 23A through 23I are schematic views showing operations of the terminal crimping portion in the terminal fitting crimping step of FIG. 22 by following a work procedure.
Figure 23B:
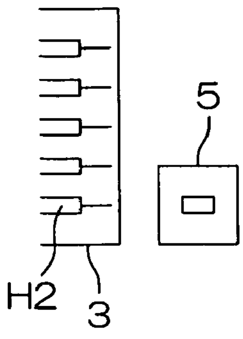

To be more concrete, the terminal crimping portion 5 is moved to the crimping position PA1 corresponding to the foremost electric wire H2 in the moving step (see FIG. 23B). Herein, the terminal crimping portion 5 is positioned at the positions of the top force 87 and the bottom force 86 when viewed in a plane.

Figure 23C:
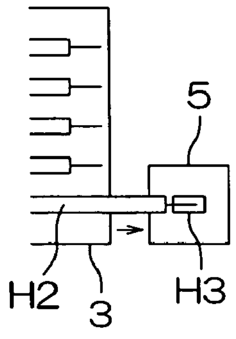

In the following heterogeneous electric wire holding step, the foremost electric wire H2 alone is fed by the predetermined length by the electric wire feeding mechanism 8 (see FIG. 23C). The end portion H7 of the electric wire H2 is thereby placed at the corresponding crimping position PA1, and disposed between the top force 87 and the bottom force 86 in the terminal crimping portion 5 that has been moved to this position earlier. The position of the end portion H7 of the electric wire H2 referred to herein means a position of a portion of the end portion H7 onto which the terminal fitting H3 is to be crimped by the terminal crimping portion 5.

In the following crimp height adjusting step, the crimp height is adjusted depending on the kind of the foremost electric wire H2, which will be subject to crimping in the following crimping step, by the crimp height adjusting mechanism 74.

Figure 23D:
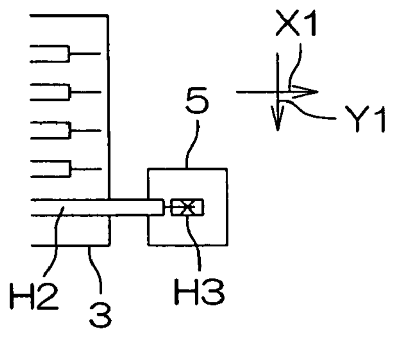
Figure 23E:
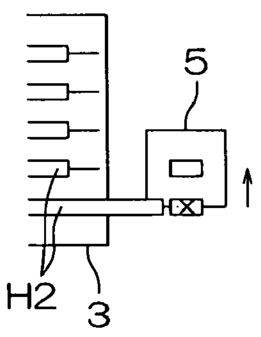
Figure 23F:
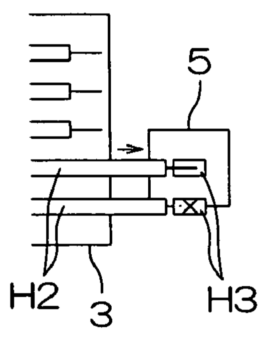

In the following crimping step, the terminal fitting H3 is crimped onto the end portion H7 of the foremost electric wire H2 by the press mechanism 73 (see FIG. 23D).

When the crimping step ends, whether the four steps have been completed for all the electric wires H2 subject to crimping is judged in Step S26.

In a case where there is an electric wire H2 for which the four steps have not been completed (NO in Step S26), the flow returns to Step S22 to repeat the four steps for this electric wire H2. For example, the moving step (see FIG. 23E), the heterogeneous electric wire holding step (see FIG. 23F), the crimp height adjusting step, and the crimping step are performed sequentially to crimp the terminal fitting H3 onto the electric wire H2 held second from the front. Thereafter, the four steps are repeated until the terminal fitting H3 is crimped onto the end portion H7 of the rearmost electric wire H2.

Figure 23G:
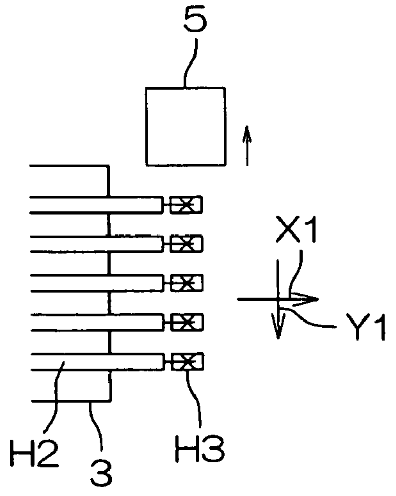
Figure 23H:
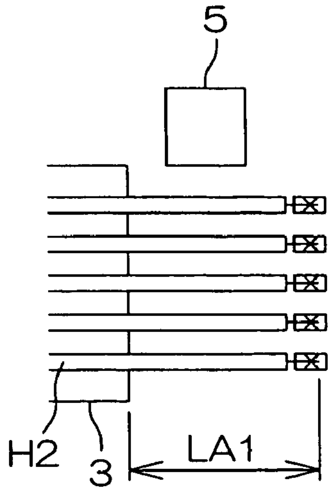
Figure 23I:
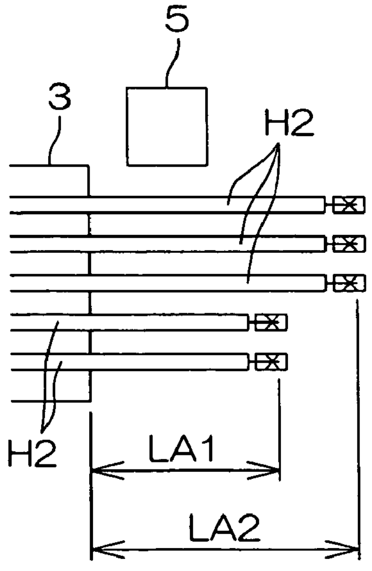

When the terminal fittings H3 are crimped onto all the electric wires H2 subject to crimping (YES in Step S26), the terminal crimping portion 5 is retracted to the retraction position PA6 by the crimping portion moving mechanism 10 (Step S27) (see FIG. 23G). In a case where there is an electric wire H2 to which the terminal fitting H3 is not be crimped, the moving step and the heterogeneous electric wire holding step alone are performed, and the crimp height adjusting step and the crimping step are not performed.

In the electric wire feeding step and the electric wire length measuring step in Step S4, each electric wire H2 is fed by the electric wire feeding mechanism 8 by a predetermined length pre-set according to the electric wire H2 in a direction intersecting with the crimping line PA7, for example, rightward along the transverse direction X1. Initially, all the electric wires H2 are fed by a first predetermined length LA1 (see FIG. 23H). The first pre-determined length LA1 is set to the shortest length among the predetermined lengths for plural electric wires H2. Then, an electric wire H2 for which the first predetermined length is insufficient is fed by a second predetermined length LA2 (see FIG. 23I). The feeding of the electric wire H2 is stopped when the feeding length of the electric wire H2 reaches the predetermined length that has been previously set, and the feeding is continued until the feeding lengths of all the electric wires H2 reach their respective predetermined lengths that have been previously set.

In the insulation displacement terminating step in Step S5, the electric wire holding portion 3 is moved by the electric wire holding portion advancing/retracting mechanism 7 to be placed at the first position PD1, which is the retraction position on the left (see FIG. 15). The electric wire holding portion 3 in this instance holds plural electric wires H2 with the terminal fittings H3 which are fed by a considerable length, and the portions to be insulation displacement terminated of the electric wires H2 are stopped and placed respectively at the insulation displacement termination positions PB1, PB2, and so forth.

Referring to FIGS. 17A through 17D and FIGS. 18A through 18C, in the insulation displacement terminating step, all the electric wires. H2 held by the electric wire holding portion 3 are successively insulation displacement terminated from the rearmost electric wire H2 to the foremost electric wire H2. For example, the insulation displacement terminating punch 108 of the insulation displacement terminating portion 6 is positioned directly above the insulation displacement termination position PB5 for the rearmost electric wire H2 by the insulation displacement terminating portion moving mechanism 11. Meanwhile, the insulation displacement termination terminal H9 in the insulation displacement termination connector H4 corresponding to the rearmost electric wire H2 is positioned directly below the insulation displacement termination position PB5 by the insulation displacement termination connector moving mechanism 12 (see FIG. 17C). Subsequently, a predetermined portion of the rearmost electric wire H2 is cut while it is being held, and the electric wire H2 on the side without the terminal fitting H3 is insulation displacement terminated to the insulation displacement termination connector H4 (see FIG. 17D). Subsequently, the insulation displacement terminating punch 108 of the insulation displacement terminating portion 6 is positioned directly above the insulation displacement termination position PB4 of the electric wire H2 placed second from the rear by the insulation displacement terminating portion moving mechanism 11, meanwhile the insulation displacement termination terminal H9 of the insulation displacement termination connector H4 corresponding to the electric wire H2 placed second from the rear is positioned directly below the insulation displacement termination position PB4 by the insulation displacement termination connector moving mechanism 12 (see FIG. 18B) for the cutting and the insulation displacement termination to be performed for this electric wire H2 (see FIG. 18C). The insulation displacement termination is repeated for all the electric wires H2.

In this instance, because the insulation displacement terminating portion 6 and the insulation displacement termination connector moving mechanism 12 are allowed to move to positions corresponding to the insulation displacement termination positions PB1, PB2, and so forth for the plural electric wires H2 held by the electric wire holding portion 3, even when the pitch L1 of the electric wire holding portion 3 and the pitch of the plural insulation displacement termination terminals H9 in the insulation displacement termination connector H4 are different, a difference in pitch can be absorbed. The insulation displacement termination therefore can be performed successively.

As has been described, the manufacturing device 1 of an electric wire with terminal of this embodiment can achieve relative movements between the terminal crimping portion 5 and the electric wire holding portion 3 to supply the electric wires H2 to the terminal crimping portion 5 by the movements of the electric wire holding portion 3 in the transverse direction X1 and the movements of the crimping portion moving mechanism 10 along the longitudinal direction Y1. This eliminates the need for the electric wire holding portion 3 to move in the longitudinal direction Y1. It is thus possible to simplify the structures of the electric wire holding portion 3 and the electric wire holding portion advancing/retracting mechanism 7. In addition, the movable range of the terminal crimping portion 5 can be far smaller than a movable range of the transportation device adopting the transfer method, which is as large as the overall manufacturing device 1 of an electric wire with terminal. The manufacturing device 1 of an electric wire with terminal can be therefore reduced in size.

Because plural crimping positions PA1, PA2, and so forth can be set along the longitudinal direction Y1 as the crimping portion moving direction, by moving the terminal crimping portion 5 while plural electric wires H2 are aligned and held by the electric wire holding portion 3, it is possible to crimp the terminal fittings H3 successively onto these plural electric wires H2. Moreover, because this advantage can be achieved with the use of the crimping portion moving mechanism 10, the need to move the electric wire holding portion 3 in the direction along which the electric wires H2 are aligned can be eliminated. This can in turn prevent the electric wire holding portion 3 from becoming complicated in structure and hence from increasing in size. These configurations are therefore preferable to reduce the manufacturing device 1 of an electric wire with terminal in size.

In addition, the crimp height can be adjusted depending on the kind of an electric wire H2 subject to crimping by the crimp height adjusting mechanism 74. When configured in this manner, in a case where the electric wires H2 subject to crimping are of plural kinds, caulking heights of terminals to be crimped that best suit the electric wires H2 of respective kinds can be readily obtained automatically. Moreover, because the terminal crimping portion 5 can be used commonly for the crimping of plural kinds of electric wires H2, the manufacturing device 1 of an electric wire with terminal can be reduced further in size.

Further, the incision depth L2 in the coating portion H6 can be adjusted depending on the kind of the electric wire H2 by the incision depth adjusting mechanism. Hence, when the electric wires H2 from which the coating portions H6 are to be removed are coated electric wires of plural kinds, incision depths L2 that best suit the electric wires H2 of respective kinds can be readily obtained automatically. Moreover, because the strip mechanism 4 can be used commonly to remove the coating portions H6 from the electric wires H2 of plural kinds, the manufacturing device 1 of an electric wire with terminal can be reduced further in size.

Furthermore, the strip mechanism 4 is allowed to move between the processing position PE1 and the retraction position PE2 by the strip mechanism moving mechanism 9. The strip mechanism 4 thereby moves to the retraction position PE2 after it removes the coating portion H6 from the electric wire H2 at the processing position PE1 so as not to interfere with crimping. As a result, because the degree of flexibility in the layout of the electric wire holding portion 3 and the terminal crimping portion 5 can be increased, the manufacturing device 1 of an electric wire with terminal can be reduced further in size.

In addition, because the moving direction of the strip mechanism moving mechanism 9 is parallel to the longitudinal direction Y1, which is the crimping portion moving direction, the interval between the strip mechanism 4 and the terminal crimping portion 5 in the transverse direction X1 does not have to be excessively long in the entire range from the processing position PE1 to the retraction position PE2. The manufacturing device 1 of an electric wire with terminal can be therefore reduced further in size. This advantage can be achieved also in a case where the moving direction of the strip mechanism moving mechanism 9 is a direction intersecting with the longitudinal direction Y1, which is the crimping portion moving direction, at a minute angle. In short, it is sufficient when the moving direction of the strip mechanism moving mechanism 9 is almost parallel to the crimping portion moving direction.

The length of the electric wire H2 fed by the electric wire feeding mechanism 8 can be measured by the rotation angle detector 43 serving as the electric wire length measuring unit and the calculation portion 44. This allows the electric wire H2 to be fed while the length thereof is measured in a state where the electric wire H2 is released from the stopping by the electric wire holding portion 3. It is thus possible to obtain an electric wire H2 of a desired length with the terminal fitting H3 being crimped onto the end portion H7. For example, an electric wire H2 of a desired length can be obtained by cutting the electric wire H2 fed from the electric wire holding portion 3 at the basal portion. In a case where plural electric wires H2 of different lengths are handled, the electric wire holding portion 3 can be used commonly for plural electric wires H2 of different lengths, and the manufacturing device 1 of an electric wire with terminal can be therefore reduced further in size.

In this embodiment, the electric wires H2 being held are insulation displacement terminated to the insulation displacement termination connector H4 by the insulation displacement terminating portion 6 by moving the electric wire holding portion 3 from the crimping positions PA1, PA2 and so forth to the insulation displacement termination positions PB1, PB2, and so forth. Because the electric wire holding portion 3 can be used commonly for both crimping and insulation-displacement-terminating, the manufacturing device 1 of an electric wire with terminal can be reduced further in size. In addition, because the electric wire holding portion 3 is advanced/retracted at the time of crimping and insulation-displacement-terminating, the interference between the insulation displacement terminating portion 6 and the terminal crimping portion 5 can be readily prevented. Moreover, the structures to move the insulation displacement terminating portion 6 and the terminal crimping portion 5 to prevent interferences can be simpler, which contributes to a reduction of the manufacturing device 1 of an electric wire with terminal in size.

It is preferable that the electric wire holding portion 3 holds plural electric wires H2 aligned along the longitudinal direction Y1, which is the crimping portion moving direction, because in this case, plural terminal fittings H3 can be crimped onto the end portions H7 of plural electric wires H2 in a one-to-one correspondence. Because this advantage can be achieved with the use of the crimping portion moving mechanism 10, the need to move the electric wire holding portion 3 in the direction along which the electric wires H2 are aligned can be eliminated. This can prevent the electric wire holding portion 3 from becoming complicated in structure and hence from increasing in size. In addition, because the electric wire holding portion 3 can hold plural electric wires H2 in parallel, the electric wire holding portion 3 can be reduced in size. The manufacturing device 1 of an electric wire with terminal can be therefore reduced further in size.

Both the terminal crimping portion 5 and the electric wire holding portion 3 are provided as fixed members to be allowed to move with respect to the base 14, and the longitudinal direction Y1, which is the moving direction of the terminal crimping portion 5, and the transverse direction X1, which is the moving direction of the electric wire holding portion 3, are set in directions intersecting with each other. This configuration not only simplifies the structures of the crimping portion moving mechanism 10 and the electric wire holding portion advancing/retracting mechanism 7, but also increases the degree of flexibility in the layout of the terminal crimping portion 5 and the electric wire holding portion 3, and is therefore preferable to reduce the manufacturing device 1 of an electric wire with terminal in size.

Because the terminal crimping portion 5 crimps the terminal fittings H3 successively onto the end portions H7 of the electric wires H2 held in parallel one by one, it can readily correspond to electric wires H2 and terminal fittings H3 of different kinds. Also, because the electric wire holding portion 3 can be reduced in size by being able to hold plural electric wires H2 in parallel, a quantity of movements of the terminal crimping portion 5 at the time of crimping can be reduced, which can in turn shorten the tact time. Further, the electric wire holding portion 3 is supplied with continuous wires and is thereby used commonly in each step. This configuration is therefore preferable to reduce the manufacturing device 1 of an electric wire with terminal in size.

The manufacturing method of manufacturing the electric wire H2 with terminal of this embodiment includes the moving step (Step S22), the electric wire holding step (Step S23), and the crimping step (Step S25), and in a case where the terminal fittings H3 are crimped onto plural electric wires H2 aligned in parallel, the terminal crimping portion 5 is moved for crimping. This can omit or simplify the movements of the electric wire holding portion 3, which can in turn simplify the structure related to the electric wire holding portion 3. Hence, for example, the manufacturing device 1 of an electric wire with terminal adopting this manufacturing method can be reduced in size.

Also, caulking heights of terminals to be crimped that best suit the electric wires H2 of respective kinds can be readily obtained in the crimp height adjusting step (Step S24). Moreover, because the terminal crimping portion 5 can be used commonly for the crimping of electric wires H2 of plural kinds, the manufacturing device 1 of an electric wire with terminal adopting this manufacturing method can be reduced further in size.

The manufacturing method of this embodiment includes the incision depth adjusting step (Step S13 and Step S17) of adjusting the incision depth L2 to be made by the strip blades 49 and 50 depending on the kinds of the coated electric wires. Incision depths L2 that best suit electric wires H2 of respective kinds can be therefore readily obtained. Moreover, because the strip mechanism 4 can be used commonly to remove the coating portions H6 from the electric wires H2 of plural kinds, the manufacturing device 1 of an electric wire with terminal adopting this manufacturing method can be reduced further in size.

The manufacturing method of this embodiment includes the electric wire length measuring step of measuring the length of the electric wire H2 fed in the electric wire feeding step (Step S4). It is thus possible to feed an electric wire H2 while measuring the length of the electric wire H2. An electric wire H2 of a desired length with the terminal fitting H3 being crimped onto the end portion H7 can be thus obtained. In a case where plural electric wires H2 of different lengths are handled, the electric wire holding portion 3 can be used commonly for the electric wires H2 of different lengths. The manufacturing device 1 of an electric wire with terminal adopting this manufacturing method can be therefore reduced further in size.

The manufacturing method of this embodiment includes the insulation displacement terminating step (Step S5). Because the electric wire holding portion 3 can be used for both crimping and insulation-displacement-terminating, the manufacturing device 1 of an electric wire with terminal adopting this manufacturing method can be reduced further in size.

The manufacturing device 1 of an electric wire with terminal and the manufacturing method of an electric wire with terminal of the embodiment can be modified as described below. In the following description, differences from the embodiment above will be chiefly described, and the description is omitted for the same configurations by labeling the same reference numerals to the corresponding portions.

For example, in the manufacturing method of the embodiment above, in the terminal fitting crimping step in Step S3, the moving step, the heterogeneous electric wire holding step, and the crimping step are performed in this order for the end portions H7 of plural electric wires H2 one by one. However, the invention is not limited to this order. For example, the heterogeneous electric wire holding step may be performed before the moving step, or they may be performed concurrently. In short, it is sufficient to perform the moving step and the heterogeneous electric wire holding step before the crimping step.

Alternatively, the heterogeneous electric wire holding step may be performed collectively for plural electric wires H2. For example, the end portions H7 of plural electric wires H2 are moved to plural corresponding crimping positions PA1, PA2, and so forth concurrently so as to be held collectively. Further, the end portions H7 of plural electric wires H2 may be moved to plural corresponding crimping positions PA1, PA2, and so forth successively one by one, after which they are held collectively. In these cases, after the plural electric wires H2 are moved and held collectively in the heterogeneous electric wire holding step, the three steps, including the moving step, the crimp height adjusting step, and the crimping step, may be performed repetitively for the respective electric wire H2 one by one. That is to say, the terminal crimping portion 5 is moved and stopped at the respective crimping positions PA1, PA2, and so forth while the end portions H7 of plural electric wires H2 are placed at the crimping positions PA1, PA2, and so forth, either concurrently or successively, so that the terminal fittings H3 are crimped successively.

The insulation displacement terminating step may be omitted from the manufacturing method of this embodiment described above. In addition, the electric wire length measuring step, and further, the electric wire feeding step may be omitted from the respective embodiments described above. Furthermore, the incision depth adjusting step may be omitted from the respective embodiments described above.

The heterogeneous electric wire holding step of the embodiment described above may be replaced with a homogeneous electric wire holding step of holding the end portions H7 of plural electric wires H2 of a single kind at the crimping positions PA1, PA2, and so forth on the crimping line PA7, either concurrently or successively. In this case, the crimp height adjusting step may be omitted. It is sufficient for the manufacturing method of this embodiment to include either the homogeneous electric wire holding step or the heterogeneous electric wire holding step as the electric wire holding step of holding the end portions H7 of plural electric wires H2 at the crimping positions PA1, PA2, and so forth on the crimping line PA7.

In the manufacturing device 1 of an electric wire with terminal of the embodiment described above, the electric wire holding portion 3 is provided with a configuration such that stops plural electric wires H2 and releases them from the stopping independently, and a configuration such that stops plural electric wires H2 and releases them from the stopping collectively. However, the invention does not necessarily include both configurations, and one of the configurations may be omitted.

In the embodiment descried above, the electric wire holding portion 3 may hold a single electric wire H2 alone. Even in such a case, there is no need to move the electric wire holding portion 3 along the longitudinal direction Y1, and the moving mechanism of the electric wire holding portion 3 can be thereby simpler. It is thus possible to reduce the overall manufacturing device 1 of an electric wire with terminal in size in comparison with a case where the transportation device adopting the transfer method in the related art is used.

In the embodiment described above, the insulation displacement terminating portion 6 may be omitted.

In the embodiment described above, the electric wire length measuring unit can be omitted when electric wires H2 that have been previously cut in a predetermined length are held by the electric wire holding portion 3.

In the embodiment described above, the strip mechanism moving mechanism 9 moves in parallel with the crimping portion moving direction. However, the invention is not limited to this configuration. For example, the strip mechanism moving mechanism 9 may be moved along a direction intersecting with the crimping portion moving direction.

In the embodiment described above, plural strip blades 49 and 50 are provided, so that the coating portions H6 can be removed collectively from plural electric wires H2. However, the invention is not limited to this configuration, and only a pair of strip blades 49 and 50 may be provided. Also, although the incision depth L2 to be made by the strip blades 49 and 50 is adjustable, the incision depth L2 may be adjusted manually, or to be fixed to a predetermined constant value. Alternatively, plural kinds of strip blades 49 and 50 may be provided. When plural kinds of strip blades 49 and 50 are provided, the plural kinds of strip blades 49 and 50 are switched for use to best suit the kind of the electric wire H2.

In a case where an electric wire H2 subject to crimping is an electric wire H2 from which the coating portion H6 does not have to be removed, such as an electric wire H2 of a fine diameter onto which the terminal fitting H3 is crimped without removing the coating portion H6, an electric wire H2 from which the coating portion H6 has been previously removed, or an electric wire H2 comprising a core wire H5 alone, the strip mechanism 4 and the strip mechanism moving mechanism 9 may be omitted.

In the embodiment described above, the respective grooves 19 in the electric wire holding portion 3 are formed to be able to hold electric wires H2 of plural kinds. However, the invention is not limited to this configuration. For example, at least one groove 19 may be formed as a groove 19 used exclusively to hold an electric wire H2 of a predetermined one kind, or it may be configured in such a manner that the electric wire holding portion 3 as a whole is able to hold electric wires H2 of plural kinds.

In the manufacturing device 1 of an electric wire with terminal of the embodiment described above, only a single terminal crimping portion 5 capable of adjusting the crimp height is provided. However, the invention is not limited to this configuration. For example, plural terminal crimping portions 5, including at least one terminal crimping portion 5 capable of adjusting the crimp height, may be provided. Alternatively, plural terminal crimping portions 5, each capable of adjusting the crimp height for an electric wire H2 of the corresponding kind among electric wires H2 of plural kinds, may be provided. When plural terminal crimping portions 5 are provided, by allowing at least one, and more preferably all of the terminal crimping portions 5 to move by the crimping portion moving mechanism 10, it is possible to achieve the same advantages as those achieved by the embodiment described above.

In a case where the manufacturing device 1 of an electric wire with terminal handles electric wires H2 of a single kind alone, the crimp height adjusting mechanism 74, the control section 97, and the incision depth adjusting mechanism and the control section 67 for this mechanism may be omitted.

The crimping portion moving mechanism 10 may be allowed to move only among the plural crimping positions PA1, PA2, and so forth within the work area P1. Even in this case, there can be achieved an advantage that the manufacturing device of an electric wire with terminal can be reduced in size.

In the embodiment described above, the crimping portion moving direction is set along a straight line that has been previously determined. However, it may be set along a curve that has been previously determined, for example, along a direction along which an arc extends. Although it is not shown in the drawing, in this case, it is preferable that the electric wire holding portion 3 holds plural electric wires H2 in such a manner that they extend along plural lines extending radially in different directions from the curvature central position of the curve. Also, the crimping portion moving mechanism 9 may be allowed to move along the curve or rotate about the curvature central position. The movements and the placements along the direction intersecting with the crimping portion moving direction, for example, the longitudinal direction Y1, in the embodiment described above will be movements and placements along a radial direction of the arc.

In the embodiment described above, the electric wire holding portion 3 is allowed to move with respect to the base 14; however, it may be fixed to the base 14.

In the embodiment described above, the terminal fitting H3 has an open barrel; however, it may be a terminal fitting H3 having a closed barrel. The electric wire H2 is a coated electric wire; however, it may be an electric wire H2 comprising a core wire H5 alone without the coating portion H6.

While the embodiments of the invention have been described in detail, it should be appreciated that these embodiments represent examples to provide clear understanding of the technical contents of the invention, and the invention is not limited to these examples. The sprit and the scope of the invention, therefore, are limited solely by the scope of the appended claims.

This application is based upon and claims the benefit of priority from the prior Japanese Patent Application No. 2004-92816 filed with the Japanese Paten Office on Mar. 26, 2004, the entire contents of which are incorporated herein by reference.

What is claimed is:

1. A manufacturing device of an electric wire with terminal by crimping a terminal fitting onto an end portion of an electric wire, comprising:

an electric wire holding portion to hold the end portion of the electric wire at a predetermined crimping position;

a terminal crimping portion, provided to be movable with respect to the end portion of the electric wire held at the crimping position by the electric wire holding portion along a predetermined crimping portion moving direction that intersects with a direction along which the end portion of the electric wire extends, to crimp the terminal fitting to the end portion of the electric wire at the crimping position; and a crimping portion moving mechanism to move the terminal crimping portion along the crimping portion moving direction.

2. The manufacturing device of an electric wire with terminal according to claim 1, wherein:

the terminal crimping portion includes a crimping applicator to caulk the terminal fitting onto the end portion of the electric wire, a press mechanism to provide the crimping applicator with a crimping force, and a crimp height adjusting mechanism to adjust a crimp height of the terminal fitting in the crimping applicator; and the manufacturing device further comprises a crimp height control unit to control the crimp height adjusting mechanism depending on a kind of an electric wire subject to crimping.

3. The manufacturing device of an electric wire with terminal according to claim 1, wherein the electric wire is a coated electric wire formed by coating a core wire with a coating portion made of a resin material, and wherein the manufacturing device further comprises:

a strip mechanism having a strip blade to make an incision in the coating portion on the end portion of the electric wire held by the electric wire holding portion, and an incision depth adjusting mechanism to adjust an incision depth to be made by the strip blade; and an incision depth control unit to control the incision depth adjusting mechanism depending on a kind of an electric wire from which the coating portion is to be removed.

4. The manufacturing device of an electric wire with terminal according to claim 3, further comprising:

a strip mechanism moving mechanism to move the strip mechanism substantially in parallel with the crimping portion moving direction between a processing position at which removing processing is performed to remove the coating portion from the electric wire and a retraction position retracted from a space between the electric wire holding portion and the crimping position.

5. The manufacturing device of an electric wire with terminal according to claim 1, wherein the electric wire holding portion is capable of switching between a stopped state where the electric wire is stopped and a released state where stopping of the electric wire is released to allow the electric wire to move, and wherein the manufacturing device further comprises:

an electric wire feeding mechanism to feed the electric wire along an electric wire feeding direction that goes along a direction of the electric wire when held by the electric wire holding portion; and an electric wire length measuring unit to measure a length of the electric wire fed by the electric wire feeding mechanism.

6. The manufacturing device of an electric wire with terminal according to claim 1, further comprising:

an electric wire holding portion advancing/retracting mechanism to cause the electric wire holding portion to advance/retract with respect to the crimping position along a direction of the electric wire when held by the electric wire holding portion; and an insulation displacement terminating portion to insulation-displacement-terminate the electric wire to an insulation displacement connector at a predetermined insulation displacement termination position which is a position in close proximity to the electric wire holding portion when the electric wire holding portion holds the electric wire at a retraction position retracted from the crimping position.

7. The manufacturing device of an electric wire with terminal according to claim 1, wherein:

the electric wire holding portion is capable of holding plural electric wires in parallel along the crimping portion moving direction.

* * * * *